(12) United States Patent
Kawakusu

(10) Patent No.: US 9,365,717 B2
(45) Date of Patent: Jun. 14, 2016

(54) CARBOXYL GROUP-CONTAINING POLYIMIDE, THERMOSETTING RESIN COMPOSITION AND FLEXIBLE METAL-CLAD LAMINATE

(75) Inventor: Tetsuo Kawakusu, Ohtsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 13/979,750

(22) PCT Filed: May 30, 2012

(86) PCT No.: PCT/JP2012/063870
§ 371 (c)(1),
(2), (4) Date: Jul. 15, 2013

(87) PCT Pub. No.: WO2012/165457
PCT Pub. Date: Dec. 6, 2012

(65) Prior Publication Data
US 2013/0310486 A1     Nov. 21, 2013

(30) Foreign Application Priority Data

| May 31, 2011 | (JP) | 2011-121740 |
| Sep. 27, 2011 | (JP) | 2011-210610 |
| Oct. 28, 2011 | (JP) | 2011-236919 |
| Jan. 30, 2012 | (JP) | 2012-016119 |
| Jan. 30, 2012 | (JP) | 2012-016120 |
| Jan. 30, 2012 | (JP) | 2012-016121 |

(51) Int. Cl.
*C08L 79/08* (2006.01)
*C08G 18/34* (2006.01)
*C08G 73/10* (2006.01)
*C08G 18/76* (2006.01)

(52) U.S. Cl.
CPC .............. *C08L 79/08* (2013.01); *C08G 18/346* (2013.01); *C08G 18/7621* (2013.01); *C08G 18/7671* (2013.01); *C08G 73/1035* (2013.01)

(58) Field of Classification Search
CPC ................................ C08L 63/00; C08L 79/08
USPC ........................................................ 523/451
See application file for complete search history.

(56) References Cited

U.S. PATENT DOCUMENTS

| 6,211,326 | B1 | 4/2001 | Glasper et al. | |
| 2009/0008138 | A1* | 1/2009 | Uchida et al. | 174/256 |
| 2010/0113689 | A1* | 5/2010 | Naiki et al. | 524/606 |
| 2010/0132989 | A1* | 6/2010 | Fujihara et al. | 174/258 |
| 2012/0097435 | A1* | 4/2012 | Goshima et al. | 174/255 |
| 2013/0189624 | A1* | 7/2013 | Koda et al. | 430/280.1 |
| 2013/0308233 | A1* | 11/2013 | Ishihara et al. | 361/56 |
| 2014/0370301 | A1* | 12/2014 | Sekito | 428/423.1 |
| 2015/0044451 | A1* | 2/2015 | Kido et al. | 428/327 |

FOREIGN PATENT DOCUMENTS

| JP | 8-208835 | 8/1996 |
| JP | 2000-183539 | 6/2000 |
| JP | 2005-298568 | 10/2005 |
| JP | 4016226 | 9/2007 |
| JP | 2007-270137 | 10/2007 |
| JP | 2009-185200 | 8/2009 |
| JP | 2010-70757 | 4/2010 |
| JP | 2011-59340 | 3/2011 |
| JP | 2011-84653 | 4/2011 |
| WO | 2010/010831 | 1/2010 |
| WO | WO 2010126133 A1 * | 11/2010 |

OTHER PUBLICATIONS

English language machine translation of JP 2010-070757. Original Japanese document published Apr. 2010. Translation printed Jun. 18, 2014.*
International Search Report issued Sep. 11, 2012 in International (PCT) Application No. PCT/JP2012/063870.
"Recent Polymides—Fundamentals and Applications," Kabushiki Kaisha TNS, Aug. 25, 2010, pp. 6 and 7, with partial English translation.
International Preliminary Report on Patentability issued Dec. 2, 2013, and English translation of Written Opinion of the International Searching Authority issued Sep. 11, 2012 in International (PCT) Application No. PCT/JP2012/063870.
Extended European Search Report issued May 6, 2015 in European Application No. 12793349.7.

* cited by examiner

*Primary Examiner* — Megan McCulley
(74) *Attorney, Agent, or Firm* — Wenderoth, Lind & Ponack, L.L.P.

(57) ABSTRACT

The present invention aims to provide a carboxyl group-containing polyimide, and prepolymer thereof which give a cured product highly satisfying thermosetting property, PCT resistance, solvent resistance and peel strength at the same time. The present invention relates to a terminal acid anhydride group-containing imide prepolymer which is characterized by being produced by reacting an acid anhydride group in a tetracarboxylic acid dianhydride with an isocyanate group in a diisocyanate compound, and a carboxyl group-containing polyimide which is characterized in having such a structure where the chain of said terminal acid anhydride group-containing imide prepolymer is extended via a polyol compound. The present invention also relates to a thermosetting resin composition and a flexible metal-clad laminate which utilize such carboxyl group-containing polyimide.

6 Claims, 2 Drawing Sheets

CARBOXYL GROUP-CONTAINING POLYIMIDE, THERMOSETTING RESIN COMPOSITION AND FLEXIBLE METAL-CLAD LAMINATE

TECHNICAL FIELD OF THE INVENTION

The present invention relates to a carboxyl group-containing polyimide used as a material for a thermosetting polyimide resin giving a cured product being excellent in thermosetting property, PCT resistance, solvent resistance and peel strength as an adhesive or a coating agent for electronic material peripherals and also to a prepolymer thereof.

The present invention also relates to a thermosetting resin composition advantageously used as a resist layer for printed circuit board which satisfies flame retarding property, solder dip resistance, heat aging resistance and flexibility at the same time.

The present invention further relates to a flexible metal-clad laminate having resin layer and metal foil layer prepared by thermosetting of the above-mentioned carboxyl group-containing polyimide and particularly to a flexible metal-clad laminate which can satisfy thermosetting property, peel strength, PCT resistance and solvent resistance at the same time.

BACKGROUND ART

Polyimide has been widely used in electronic material peripherals and OA instrument device peripherals due to its excellence in heat resistance, reliability for electric insulation, chemical resistance and mechanical characteristics. For example, it is used for forming an insulation film or a protective coating material on semiconductor devices, a base material or a surface protecting material for flexible circuit board or integrated circuit and an interlayer insulating coating layer or a protective coating layer for fine circuit.

In general, many of polyimides are insoluble in a solution and are lacking in processing ability. Therefore, it is general that polyamic acid (also called polyamide acid) which is a precursor thereof is polymerized in a solution, processed into a film or other molded products and then imidized. Usually, heating at 250° C. or higher is needed for conversion of polyamic acid into an imide.

However, there has been a problem when the processing is done by the above means such as that the electronic material is not durable against the high temperature, adhesiveness to the base material is insufficient, etc. because the heating temperature therefor is high. Moreover, since water is generated when polyamic acid is subjected to ring closure and converted into polyimide, there is another problem such as that shrinking upon curing is resulted whereby the base material is curled.

In addition, polyamic acid has such a characteristic that a decrease in molecular weight and a branching of resin structure are apt to happen due to hydrolysis caused by water generated by imidization and by water existing in the liquid. As a result, there is a tendency that its solution viscosity is apt to become low with elapse of time (cf. Non-Patent Document 1). The instability of the solution viscosity as such is particularly significant during the preservation at room temperature and, since no product having a uniform quality can be produced, that is not favorable in view of its practical application.

Under such circumstances, there has been investigated for a polyimide which is soluble in organic solvents being such a type where imidization is made to finish in an organic solvent. For example, in the Patent Document 1, there is a proposal for a modified polyimide of such a type which is soluble in organic solvents and has a polybutadiene skeleton and there are disclosed examples where a thermosetting composition using a blocked isocyanate as a curing agent for a terminal acid anhydride group-containing polyimide produced by an isocyanate method is used as an overcoating agent for flexible circuit board.

However, this thermosetting composition has the following problems:

(1) Since the acid anhydride group is present only in the terminal of the resin, no sufficient thermosetting property can be achieved;

(2) Since the resin skeleton contains urethane bond, heat resistance is low; and (3) Intramolecular cross-linking is induced by oxidation which is specific to the polybutadiene skeleton whereupon the resin is gelled during the reaction or the stability as the composition during its preservation significantly lowers.

In recent years, there has been an increasingly severe demand for the characteristics in terms of materials for electronic instruments such as OA instruments and domestic electronic appliances in view of tendency for high density and high function and also for environments. With regard to a flexible printed circuit (FPC) board for example, there has been a demand for characteristics such as flexibility, low warpage, solder dip resistance, migration resistance and plating resistance.

For the surface protection of flexible printed circuit board and also for the prevention of sticking of solder upon mounting thereof, there have been a method where adhesion is conducted using an adhesive after a polyimide film called a coverlay film is punched using a metal mold meeting a pattern and also a method where a liquid or filmy solder resist agent of a thermosetting or an ultraviolet setting type is used. The latter is particularly advantageous in view of workability.

Moreover, as a result of the tendency in recent years that weight and size of electronic instruments are becoming smaller, a flexible printed circuit board is also becoming lighter and thinner whereby the affection of flexibility and shrinking upon curing of a solder resist agent is becoming to appear more significantly. Therefore, it is the current status that a solder resist agent of a curing type now does not satisfy the demanded characteristics in terms of flexibility and shrinking upon curing.

Further, if and when a polymer material (resin material) ignites due to abnormal heating caused by malfunctioning of the parts, there is a risk that it causes a fire whereby the polymer material per se is demanded to have a self-extinguishing property (non-inflammability/flame retarding property). For example, with regard to a solder resist agent used for a flexible printed circuit board, there is a tendency of reducing the environmental load in recent years and there has been a demand for making it lowly harmful, lowly fuming and flame retarding under a non-halogen (halogen-free) state.

As to an art for achieving the flame retarding property, there may be exemplified a method where a flame retardant of a phosphate type is added but, for achieving the flame retarding property of a high degree, it is necessary to add a large amount of a flame retardant whereby there is a risk that the characteristics such as adhesive property, mechanical characteristic and heat resistance become low and there may also cause a problem such as that the flame retardant per se is bled out whereby the adhesive property lowers with elapse of time.

As such, a solder resist agent of a curing type is demanded to satisfy various properties depending upon the use. Particularly when it is used for electronic parts or the like, a flame retarding property is demanded as an important property in addition to solder dip resistance, flexibility, etc. and, when the flame retarding property is low, the use is limited.

In order to cope with the high demand for the peripheral components for electronic materials as such, various investigations have been conducted already but the thing which fully satisfies all characteristics has not been achieved yet. For example, the Patent Document 2 discloses a thermosetting composition in which an epoxy compound is used as a curing agent for a soluble polyimide having a carboxyl group in the side chain. However, since water is generated upon a ring closure reaction of polyamic acid during the polymerization of resin, branching of the resin structure is resulted or molecular weight of the resin hardly rises. Therefore, the cured product is low in its strength and is poor in its durability. When polymerization is carried by this method, it is difficult to achieve high acid value and to fully raise the molecular weight of the resin. Further, although excellent heat resistance and softness are achieved when a silicone compound is copolymerized, adhesiveness to the base material is low and flexibility is weak.

In the Patent Document 3, there is a proposal that a thermosetting resin composition containing a thermosetting polyurethane having high acid value and a phosphorus atom-containing organic filler is used as a solder resist agent or the like for a circuit base material. In the thermosetting polyurethane used here, polymerizing property of a carboxyl group-containing dihydroxy compound which is a starting material is low whereby molecular weight distribution is apt to expand, cross-linking points are unbalancedly present in particular areas in the main chain of the resin and unreacted substance abundantly remains. Therefore, no sufficient thermosetting property and flexibility can be achieved and heat resistance is low due to the residence of the unreacted substance.

In the Patent Document 4, there is disclosed an example where a thermosetting resin composition prepared by compounding polyamideimide with an epoxy compound as a curing agent is used as an overcoating agent for a flexible circuit board. Since this thermosetting resin composition has a cross-linking point only in the resin terminal, no sufficient thermosetting property is achieved. In addition, since the resin skeleton contains a urethane bond, heat resistance is low.

In the Patent Document 5, there is disclosed an example where a thermosetting urethane resin is compounded as an adhesive and a coating agent for electronic material peripherals. Since the thermosetting urethane resin used here is polymerized by a polymerizing method via a urethane polymer, the resin skeleton contains a urethane bond. Thus, heat resistance of the resin is low in spite of excellent thermosetting property and flexibility.

Moreover, a flexible printed circuit board may become under a high temperature condition due to heat generation and it has been demanded that high reliability can be maintained even under such an environment. However, when the changes in the resin dimension at high temperature are big, detachment from metal wiring such as copper forming the circuit happens resulting in short circuit or broken wire. Further, even in a flexible multi-layered board which has been receiving public attention as a thin board in recent years, the same problem also happens when there is a big difference in the dimensional changes upon heating among an adhesive layer which adheres flexible boards each being in a single layer, a polyimide film forming the flexible board and a metal wiring such as copper forming the circuit.

In the Patent Document 6, there is disclosed an art for improving the properties at high temperature by the joint use of an epoxy resin having excellent heat resistance with an inorganic compound. However, the improving effect for solvent resistance cannot be expected.

PRIOR ART DOCUMENTS

Patent Documents

Patent Document 1: Japanese Patent No. 4016226
Patent Document 2: Japanese Patent Application Laid-Open (JP-A) No. 2005-298568
Patent Document 3: Japanese Patent Application Laid-Open (JP-A) No. 2007-270137
Patent Document 4: Japanese Patent Application Laid-Open (JP-A) No. 2009-185200
Patent Document 5: Japanese Patent Application Laid-Open (JP-A) No. 2010-070757
Patent Document 6: Japanese Patent Application Laid-Open (JP-A) No. 2000-183539

Non-Patent Document

Non-Patent Document 1: Recent Polyimides—Fundamentals and Applications—, pages 6 to 7, published by Kabushiki Kaisha TNS (Aug. 25, 2010)

DISCLOSURE OF THE INVENTION

Problem that the Invention is to Solve

The present invention has been created in view of the current status of the above-mentioned prior art and its first object is to provide a carboxyl group-containing polyimide giving a cured product which can satisfy thermosetting property, PCT resistance, solvent resistance and peel strength at the same time and also to provide a terminal acid anhydride group-containing imide prepolymer which is used as a material therefor. Its second object is to provide a thermosetting resin composition which can satisfy flame retarding property, solder dip resistance, heat aging resistance and flexibility at the same time. Its third object is to provide a flexible metal-clad laminate which can satisfy thermosetting property, peel strength, PCT resistance and solvent resistance at the same time.

Means for Solving the Problem

In order to achieve the above-mentioned objects, the present inventors have repeatedly conducted extensive investigations and found a process where imidization reaction requiring high temperature is not necessary because of without by way of polyamic acid. Thus, they have found that, when a terminal acid anhydride group-containing imide prepolymer which is a precursor for polyimide is polymerized, it is now possible to provide a carboxyl group-containing polyimide which gives a cured product satisfying the above characteristics at the same time in high degree. The carboxyl group-containing polyimide according to the present invention has such a characteristic feature that branching in the resin structure is little and molecular weight of the resin is high. Due to this characteristic, it is now possible to give a cured product which satisfies thermosetting property, PCT resistance, solvent resistance and peel strength at the same time upon combining with a thermosetting agent.

The present inventors have further found that the above characteristics can be highly satisfied at the same time by means of providing a thermosetting resin composition comprising a carboxyl group-containing polyimide which has such a structure that the chain of the above terminal acid anhydride group-containing imide prepolymer is extended via a polyol compound and an oxirane ring-containing compound.

The present inventors have furthermore found that, when a layer prepared by thermal setting of the above carboxyl group-containing polyimide is used as a resin layer for a flexible metal-clad laminate, it is now possible to provide a flexible metal-clad laminate which can satisfy thermosetting property, peel strength, PCT resistance and solvent resistance at the same time.

Thus, the present invention has been accomplished on the basis of the above findings and has the following constitutions (1) to (19):

(1) A terminal acid anhydride group-containing imide prepolymer which is characterized by being produced by reacting an acid anhydride group in a tetracarboxylic acid dianhydride with an isocyanate group in a diisocyanate compound.

(2) The terminal acid anhydride group-containing imide prepolymer according to (1), wherein its number average molecular weight is 500 to 5,000.

(3) The terminal acid anhydride group-containing imide prepolymer according to (1) or (2), wherein the tetracarboxylic acid dianhydride is at least one compound selected from the group consisting of ethylene glycol bis(trimellitic acid anhydride) (TMEG), 3,3',4,4'-diphenyltetracarboxylic acid dianhydride (BPDA), pyromellitic acid dianhydride (PMDA), 3,3',4,4'-benzophenone tetracarboxylic acid dianhydride (BTDA) and 4,4'-oxydiphthalic acid dianhydride (ODPA).

(4) The terminal acid anhydride group-containing imide prepolymer according to any of (1) to (3), wherein the diisocyanate compound is at least one compound selected from the group consisting of aromatic diisocyanate, aliphatic diisocyanate and alicyclic diisocyanate.

(5) The terminal acid anhydride group-containing imide prepolymer according to any of (1) to (4), wherein it is represented by the following formula [I]:

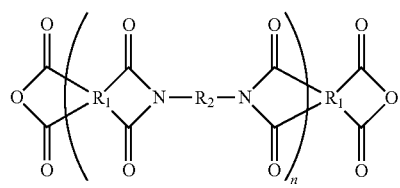

(In the formula [I], $R_1$ is an organic group after removal of a carboxyl group from an acid dianhydride compound represented by the following formula [II] and is an optionally substituted aromatic group, alicyclic group, aliphatic group or heterocycle-containing group having carbon number of 1 to 30. $R_2$ is an organic group after removal of an isocyanate group from a diisocyanate compound represented by the following formula [III] and is an optionally substituted aromatic group, alicyclic group or aliphatic group having carbon number of 1 to 30. n is an integer of 1 to 30. $R_1$ and $R_2$ in the formulae [II] and [III] have the same meanings as $R_1$ and $R_2$ in the formula [I].)

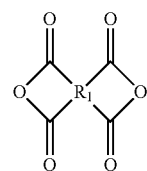

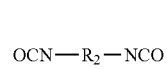

(6) A carboxyl group-containing polyimide which is characterized in having such a structure where the chain of the terminal acid anhydride group-containing imide prepolymer according to any of (1) to (5) is extended via a polyol compound.

(7) The carboxyl group-containing polyimide according to (6), wherein its number-average molecular weight is 3000 to 100000.

(8) The carboxyl group-containing polyimide according to (6) or (7), wherein its acid value is 250 to 2500 equivalents/ $10^6$ g.

(9) The carboxyl group-containing polyimide according to any of (6) to (8), wherein the polyol compound is a polycarbonate polyol compound or a polyester polyol compound.

(10) The carboxyl group-containing polyimide according to any of (6) to (9), wherein it is represented by the following formula [IV] or [V]:

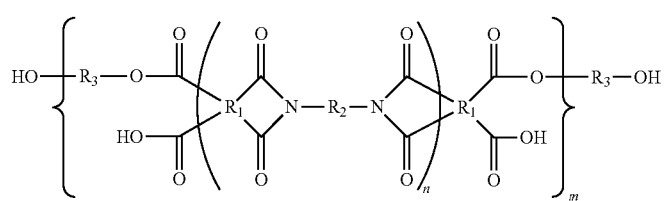

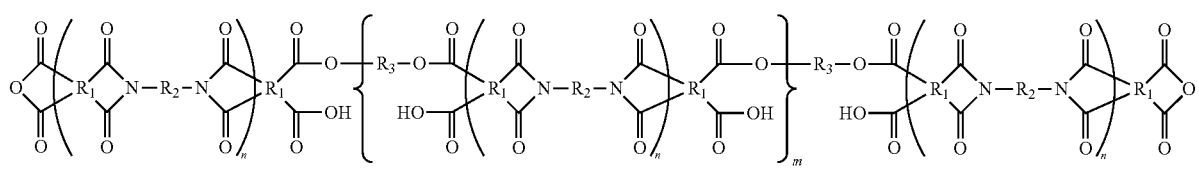

(In the formulae [IV] and [V], $R_1$ is an organic group after removal of a carboxyl group from an acid dianhydride compound represented by the following formula [II] and is an optionally substituted aromatic group, alicyclic group, aliphatic group or heterocycle-containing group having carbon number of 1 to 30. $R_2$ is an organic group after removal of an isocyanate group from a diisocyanate compound represented by the following formula [III] and is an optionally substituted aromatic group, alicyclic group or aliphatic group having carbon number of 1 to 30. $R_3$ is an alkylene group having carbon number of 1 to 20 or a residue after removal of a hydroxyl group from a diol compound having at least one bond selected from the group consisting of ester bond, carbonate bond and ether bond. n and m each dependently is an integer and n is an integer of 1 to 30 while m is an integer of 1 to 200. $R_1$ and $R_2$ in the formulae [II] and [III] have the same meanings as $R_1$ and $R_2$ in the formulae [IV] and [V].)

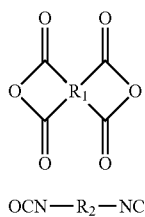

[II]

OCN—$R_2$—NCO       [III]

(11) A thermosetting resin composition to be used as a resist layer of a printed circuit board which is characterized in that it contains the carboxyl group-containing polyimide mentioned in any of (6) to (10) and an oxirane ring-containing compound.

(12) The thermosetting resin composition according to (11), wherein the using amount of an oxirane ring-containing compound is 2 to 100 parts by weight to 100 parts by weight of the carboxyl group-containing polyimide.

(13) The thermosetting resin composition according to (11) or (12), wherein it further contains a phosphorus atom-containing organic filler.

(14) The thermosetting resin composition according to (13), wherein the ratio by weight of the carboxyl group-containing polyimide, the oxirane ring-containing compound and the phosphorus atom-containing organic filler is 30 to 95/1 to 50/2 to 55.

(15) The thermosetting resin composition according to (13) or (14), wherein the total weight of the carboxyl group-containing polyimide, the oxirane ring-containing compound and the phosphorus atom-containing organic filler in the thermosetting resin composition is not less than 20% by weight.

(16) The thermosetting resin composition according to any of (11) to (15), wherein it further contains a curing promoter.

(17) A flexible metal-clad laminate containing at least metal foil layer and resin layer which is characterized in that the resin layer has been produced by thermal setting of the carboxyl group-containing polyimide mentioned in any of (6) to (10).

(18) A flexible printed circuit board which is characterized in that it has been subjected to a circuit processing using the flexible metal-clad laminate mentioned in (17).

(19) An electronic instrument which is characterized in using the flexible printed circuit board mentioned in (18).

Advantages of the Invention

When the terminal acid anhydride group-containing imide prepolymer is polymerized, it is possible to provide a carboxyl group-containing polyimide which gives a cured product highly satisfying thermosetting property, PCT resistance, solvent resistance and peel strength at the same time. Further, when the carboxyl group-containing polyimide of the present invention is used together with a thermosetting agent, it is possible to form a cross-linking structure in high degree and to prepare a strong cured coat. Furthermore, since the carboxyl group-containing polyimide of the present invention gives a cured product which highly satisfies the above characteristics, it can be advantageously used for a resist ink and an adhesive as well as for a printed circuit board, etc. of automobile parts, electric appliances, etc. using the same.

Since the thermosetting resin composition of the present invention highly satisfies the characteristics such as flame retarding property, solder dip resistance, heat aging resistance and flexibility at the same time, it can be advantageously used as a resist layer for a printed circuit board of automobile parts, electric appliances, etc.

Since the flexible metal-clad laminate of the present invention has a resin layer prepared by thermal setting of a novel carboxyl group-containing polyimide having such characteristics that branching in the resin structure is little and that molecular weight of the resin is high, it can satisfy thermosetting property, peel strength, PCT resistance and solvent resistance at the same time.

BEST MODE FOR CARRYING OUT THE INVENTION

Figure 1:
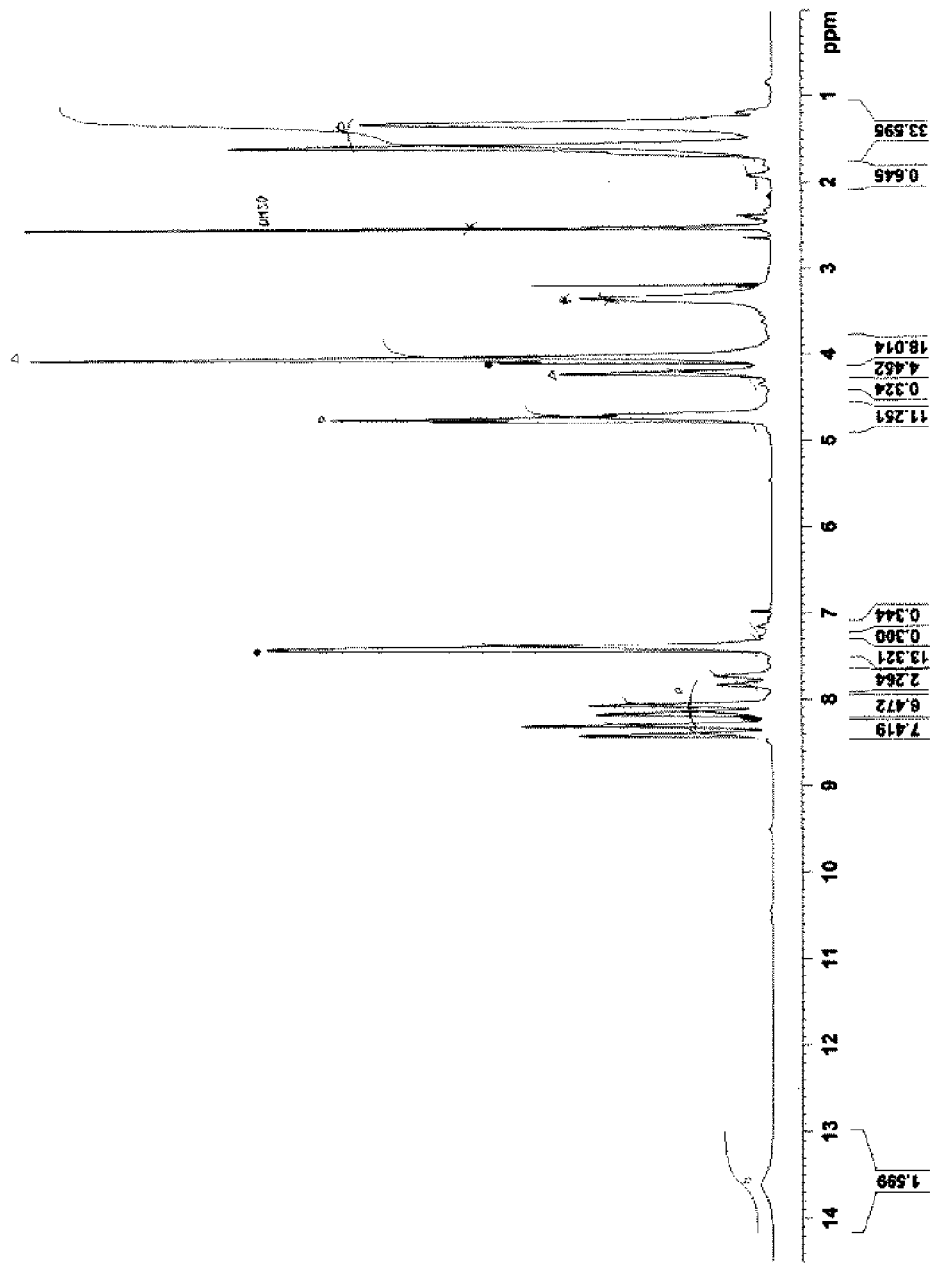
FIG. 1 shows $^1$H-NMR spectra of the carboxyl group-containing thermosetting polyimides (1-1, 1'-1 and 1"-1) produced by Synthetic Examples 1-1, 1'-1 and 1"-1.

As hereunder, embodiments of the present invention will be illustrated in detail.

"Terminal acid anhydride group-containing imide prepolymer" is an imide prepolymer which contains an acid anhydride group in the terminal. "Imide prepolymer" stands for a constituting unit of a polymer having an imide bond in the structure and being produced starting from this imide prepolymer. "Terminal acid anhydride group-containing" stands for that an acid anhydride is present in the molecular terminal. Presence of an acid anhydride group in the terminal is useful in such cases when a terminal acid anhydride group-containing imide prepolymer is further polymerized to give a polymer or when a composition which forms a cross-linking structure is prepared by combining with a thermosetting agent.

The "terminal acid anhydride group-containing imide prepolymer" of the present invention is prepared by reacting an acid anhydride group in a tetracarboxylic acid dianhydride with an isocyanate group in a diisocyanate compound. As a result of the reaction of the above acid anhydride group with the above isocyanate group, an imide bond is produced without the need of imidization reaction from polyamic acid requiring high temperature and a high heat resistance derived from the imide bond can be imparted. Further, as a result of the presence of an acid anhydride group in the molecular terminal, it is possible to give a polymer by polymerization with a compound having two or more functional groups which can react with an acid anhydride group. It is also possible to prepare a composition which forms a cross-linking structure by combining with a thermosetting agent such as an oxirane ring-containing compound.

In the terminal acid anhydride group-containing imide prepolymer according to the present invention, diisocyanate compound is used and is made to react with a tetracarboxylic acid dianhydride by means of an isocyanate method, whereby an imide bond is produced. Therefore, there is also no production of water caused by a ring closure reaction of polyamic acid. Accordingly, no branched structure is resulted and it is now possible to prepare an imide prepolymer which has an acid anhydride in the terminal.

The "carboxyl group-containing polyimide" of the present invention is produced by the further reaction of the terminal acid anhydride group-containing imide prepolymer with a polyol compound. The carboxyl group-containing polyimide of the present invention is not limited to the one produced by the above-mentioned order of the reaction so far as it has the structure as being produced by the above reaction. For example, the reaction steps of the following (1) to (2) are also covered within the same category:

(1) A tetracarboxylic acid dianhydride is made to react with a diisocyanate compound to produce a terminal acid anhydride group-containing imide prepolymer; and (2) A terminal hydroxyl group-containing compound where both terminals of a tetracarboxylic acid dianhydride bind to a polyol compound via an ester bond is made to react with a terminal acid anhydride group-containing imide prepolymer component.

When the terminal acid anhydride group-containing imide prepolymer of the present invention is subjected to a chain extension using a polyol compound, there is produced a carboxyl group-containing polyimide which has little branched structure and unreacted product and high molecular weight. There is also produced a carboxyl group-containing polyimide which has many carboxyl groups derived from the tetracarboxylic acid dianhydride in the main chain. Further, when the carboxyl group-containing polyimide is combined with a thermosetting agent such as a compound having an oxirane ring, it is possible to form a cross-linking structure in high degree at low temperature. As a result, the carboxyl group-containing polyimide of the present invention and a cross-linking substance thereof can be advantageously used for electronic material peripherals, etc. for which thermosetting property, PCT resistance, solvent resistance and peel strength are demanded.

As hereunder, the terminal acid anhydride group-containing imide prepolymer according to the present invention will be illustrated.

Specifically, the terminal acid anhydride group-containing imide prepolymer according to the present invention is preferred to be such a one which is represented by the following formula [I]:

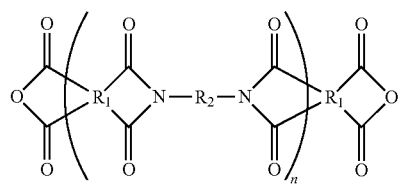

(In the formula [I], $R_1$ is an organic group after removal of a carboxyl group from an acid dianhydride compound represented by the following formula [II] and is an optionally substituted aromatic group, alicyclic group, aliphatic group or heterocycle-containing group having carbon number of 1 to 30. $R_2$ is an organic group after removal of an isocyanate group from a diisocyanate compound represented by the following formula [III] and is an optionally substituted aromatic group, alicyclic group or aliphatic group having carbon number of 1 to 30. $R_1$ and $R_2$ in the formulae [II] and [III] have the same meanings as $R_1$ and $R_2$ in the formula [I].)

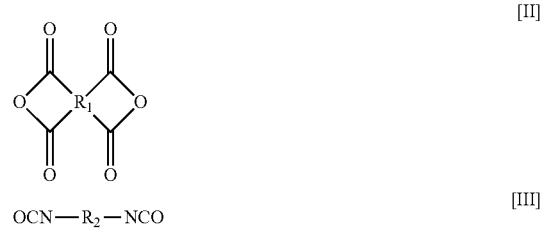

Although the tetracarboxylic acid dianhydride used for the terminal acid anhydride group-containing imide prepolymer is not particularly limited, its examples include pyromellitic acid dianhydride, 3,3',4,4'-benzophenonetetracarboxylic acid dianhydride, 2,3,2',3'-benzophenonetetracarboxylic acid dianhydride, 2,3,3',4'-benzophenonetetracarboxylic acid dianhydride, 3,3',4,4'-diphenyltetracarboxylic acid dianhydride, 2,2',3,3'-diphenyltetracarboxylic acid dianhydride, 4,4'-oxydiphthalic acid dianhydride, 2,2-bis(3,4-dicarboxyphenyl)propane dianhydride, 2,2-bis-(2,3-dicarboxyphenyl)propane dianhydride, 1,1-bis(2,3-dicarboxyphenyl)ethane dianhydride, 1,1-bis(3,4-dicarboxy-phenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, 3,4,9,10-perylenetetracarboxylic acid dianhydride, bis(3,4-dicarboxy-phenyl)etherdianhydride, 1,2,5,6-naphthalenetetracarboxylic acid dianhydride, 2,3,6,7-naphthalenetetracarboxylic acid dianhydride, 1,2,4,5-naphthalenetetracarboxylic acid dianhydride, 1,4,5,8-naphthalenetetracarboxylic acid dianhydride, phenanthrene-1,8,9,10-tetracarboxylic acid dianhydride, pyrazine-2,3,5,6-tetracarboxylic acid dianhydride, thiophene-2,3,4,5-tetracarboxylic acid dianhydride, bis(3,4-dicarboxyphenyl)dimethylsilane dianhydride, bis(3,4-dicarboxyphenyl)diphenylsilane dianhydride, 1,4-bis(3,4-dicarboxyphenyldimethylsilyl)-benzene dianhydride, 1,3-bis(3,4-dicarboxyphenyl)-1,1,3,3-tetramethyldicyclohexane dianhydride, p-phenyl bis(trimellitic acid monoester acid anhydride), ethylenetetracarboxylic acid dianhydride, 1,2,3,4-butanetetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, cyclopentane-1,2,3,4-tetracarboxylic acid dianhydride, pyrrolidine-2,3,4,5-tetracarboxylic acid dianhydride, 1,2,3,4-cyclobutanetetracarboxylic acid dianhydride, bis(exo-bicyclo[2,2,1]heptane-2,3-dicarboxylic acid anhydride) sulfone, bicyclo-(2,2,2)-oct(7)-ene-2,3,5,6-tetracarboxylic acid dianhydride, 2,2-bis(3,4-dicarboxyphenyl)-hexafluoropropane dianhydride, 2,2-bis[4-(3,4-dicarboxy-phenoxy)phenyl]hexafluoropropane dianhydride, 4,4'-bis(3,4-dicarboxyphenoxy)diphenyl sulfide dianhydride, 1,4-bis(2-hydroxyhexafluoroisopropyl)benzene bis(trimellitic acid anhydride), 1,3-bis(2-hydroxyhexafluoroisopropyl)benzene bis(trimellitic acid anhydride), 5-(2,5-dioxotetrahydro-furyl)-3-methyl-3-cyclohexene-1,2-dicarboxylic acid anhydride, tetrahydrofuran-2,3,4,5-tetracarboxylic acid dianhydride, 1,3,3a,4,5,9b-hexahydro-5-(tetrahydro-2,5-dioxo-3-furanyl)naphtho[1,2-c]furan-1,3-dione and ethylene glycol bis(trimellitic acid anhydride) (it may also be called "ethylene glycol bisanhydrotrimellitate" or "TMEG").

Preferably, the tetracarboxylic acid dianhydride is ethylene glycol bis(trimellitic acid anhydride) (TMEG), 3,3',4,4'-diphenyltetracarboxylic acid dianhydride (BPDA), pyromellitic acid dianhydride (PMDA), 3,3',4,4'-benzophenone-tetracarboxylic acid dianhydride (BTDA) or 4,4'-oxydiphthalic acid dianhydride (ODPA).

Each of those tetracarboxylic acid dianhydrides as such may be used solely or two or more thereof may be mixed and used.

Although there is no particular limitation for a diisocyanate compound used for the terminal acid anhydride group-containing imide prepolymer, there may be exemplified at least one compound selected from the group consisting of an aromatic diisocyanate, an aliphatic diisocyanate and an alicyclic diisocyanate.

With regard to a diisocyanate compound, an aromatic diisocyanate is preferred when heat resistance of the resin composition is to be particularly enhanced while, when softness of the resin composition is to be particularly enhanced, an aliphatic diisocyanate or an alicyclic diisocyanate is preferred.

Examples of the aromatic diisocyanate include 2,4-toluene diisocyanate (TDI), 2,6-toluene diisocyanate, 2,2'-diphenylmethane diisocyanate, 2,4'-diphenylmethane diisocyanate, 4,4'-diphenylmethane diisocyanate (MDI), 1,5-naphthalene diisocyanate, p-phenylene diisocyanate, m-phenylene diisocyanate, p-xylylene diisocyanate and m-xylylene diisocyanate.

Examples of the aliphatic diisocyanate include ethylene diisocyanate, 2,2,4-trimethylhexamethylene diisocyanate and 1,6-hexamethylene diisocyanate.

Examples of the alicyclic diisocyanate include 1,4-cyclohexane diisocyanate, 4,4'-dicyclohexylmethane diisocyanate, isophorone diisocyanate and nor-bornane diisocyanate.

When reactivity, solubility, cost, etc. are taken into consideration, 4,4'-diphenylmethane diisocyanate and 2,4-toluene diisocyanate are particularly preferred as the diisocyanate compound.

The diisocyanate compound can be appropriately selected and used depending upon the object and the application and it may be used solely or two or more thereof may be mixed and used.

As hereunder, a process for the production of the terminal acid anhydride group-containing imide prepolymer according to the present invention will be illustrated.

The terminal acid anhydride group-containing imide prepolymer can be produced by reacting an acid anhydride group in the tetracarboxylic acid dianhydride with an isocyanate group in the diisocyanate compound. As a result of the reaction of the above acid anhydride group with the above isocyanate group, an imide bond is formed. Incidentally, the molar ratio of the charging materials is adjusted depending upon molecular weight and acid value of the aimed carboxyl group-containing polyimide. However, it is preferred that the tetracarboxylic acid dianhydride is used more excessively than the diisocyanate compound (so as to make the acid anhydride group excessive than the isocyanate group).

The terminal acid anhydride group-containing imide prepolymer can be produced by the conventionally known process. For example, it is preferred to conduct the reaction at 60° C. to 200° C. in the presence of a solvent in a reactor equipped with stirrer and thermometer. It is more preferred to conduct the reaction at 100° C. to 180° C. When the temperature is 60° C. to 200° C., then the reaction time is short, the degradation of the monomer components hardly happens and the gelling due to three-dimensionalization reaction is rarely generated. Setting of the reaction temperature may be conducted in multiple stages. The reaction time can be appropriately selected depending upon the scale of batch, the reaction condition to be adopted and, particularly, the reaction concentration.

With regard to an organic solvent to be used for the production of the terminal acid anhydride group-containing imide prepolymer, anything may be used so far as its reactivity with an isocyanate is low. For example, a solvent containing no basic compound such as an amine is preferred. Examples of the solvent as such include toluene, xylene, ethylbenzene, nitrobenzene, cyclohexane, isophorone, diethylene glycol dimethyl ether, ethylene glycol diethyl ether, propylene glycol methyl ether acetate, propylene glycol ethyl ether acetate, dipropylene glycol methyl ether acetate, diethylene glycol ethyl ether acetate, methyl methoxypropionate, ethyl methoxypropionate, methyl ethoxypropionate, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, N-ethylpyrrolidone, γ-butyrolactone, dimethyl sulfoxide, chloroform and methylene chloride.

Preferably, the solvent is that which has a high solubility such as N,N-dimethylacetamide, N-methylpyrrolidone, N-ethylpyrrolidone or γ-butyrolactone. More preferably, the solvent is N,N-dimethylacetamide, or γ-butyrolactone. Most preferably, the solvent is γ-butyrolactone.

The production of the terminal acid anhydride group-containing imide prepolymer may be conducted in the presence of a catalyst for promoting the reaction. Thus, it may be conducted in the presence of a catalyst such as an amine (e.g., triethylamine, lutidine, picoline, undecene, triethylenediamine (1,4-diazabicyclo[2.2.2]octane) and DBU (1,8-diazabicyclo[5.4.0]-7-undecene), an alkali metal or alkaline earth metal compound (e.g., lithium methylate, sodium methylate, sodium ethylate, potassium butoxide, potassium fluoride and sodium fluoride) or a compound of metal (e.g., titanium, cobalt, tin, zinc and aluminum) or semimetal.

Number-average molecular weight of the terminal acid anhydride group-containing imide prepolymer is preferred to be 500 to 5000, more preferred to be 500 to 4500, and most preferred to be 500 to 4000. When the number-average molecular weight is 500 to 5000, its solubility in a solvent is good and that is optimum for making the molecular weight of the carboxyl group-containing polyimide high. In addition, the thermosetting property becomes good since sufficient carboxyl groups for the thermal setting can be introduced into the resin. Moreover, a hard cured coat can be formed.

Generally, a polyimide has a low solubility in an organic solvent or, with the lapse of time, a polymer component may be separated out therefrom. Influence of the polymer structure on solubility is big but, since the terminal acid anhydride group-containing imide prepolymer according to the present invention has a number-average molecular weight of as low as 500 to 5000, it shows a good solubility in organic solvents even by a combination with various materials.

The expression reading "it shows a good solubility in organic solvents" used hereinabove means that it can be dissolved in 10% by weight or more in a single solvent or in a mixture of two or more solvents being selected from toluene, xylene, ethylbenzene, nitrobenzene, cyclohexane, isophorone, diethylene glycol dimethyl ether, ethylene glycol diethyl ether, propylene glycol methyl ether acetate, propylene glycol ethyl ether acetate, dipropylene glycol methyl ether acetate, diethylene glycol ethyl ether acetate, methyl methoxypropionate, ethyl methoxypropionate, methyl ethoxypropionate, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, N-ethylpyrrolidone, γ-butyrolactone, dimethyl sulfoxide, chloroform, methylene chloride, etc. Preferably, it can be dissolved in 15% by weight or more, and more preferably 20% by weight or more. Incidentally, the judgment whether solid resin is dissolved or not is done in such a manner that a predetermined weight of resin powder passing through a sieve of 80 mesh is added to a 200-ml beaker and gently stirred at 25° C. for 24 hours, the resulting solution is allowed to stand at 25° C. for 24 hours and, in case any of gelling, heterogeneity, turbidity and separation is noted, that is judged to be "dissolved".

The terminal acid anhydride group-containing imide prepolymer according to the present invention is produced by prepolymerization of tetracarboxylic acid dianhydride and diisocyanate compound by means of an isocyanate method. Since the terminal acid anhydride group-containing imide prepolymer according to the present invention is not produced via polyamic acid, generation of water caused by a ring closure reaction thereof can be suppressed. Accordingly, the terminal acid anhydride group-containing imide prepolymer according to the present invention has the following characteristic features:

(1) There is no branched structure therein but it is linear; and (2) There are reactive acid anhydride groups on both terminals of the molecule.

The carboxyl group-containing polyimide according to the present invention produced by a chain-extension of the terminal acid anhydride group-containing imide prepolymer according to the present invention using a polyol compound has the following characteristic features:

(1) Its molecular weight can be made sufficiently high without gelling; and (2) It has many carboxyl groups in its side chains.

A composition prepared by compounding this carboxyl group-containing polyimide of high molecular weight with a thermosetting agent having a functional group which can react with a carboxylic group shows a good thermosetting property. Since it also has a tough and high cohesive force as a cured coat, it shows good peel strength to a base material such as film or metal foil. It is also possible that a high PCT resistance and solvent resistance derived from an imide bond can be imparted.

As hereunder, the carboxyl group-containing polyimide according to the present invention will be illustrated.

The carboxyl group-containing polyimide according to the present invention is produced by reacting a terminal acid anhydride group-containing imide prepolymer with a polyol compound. As to the polyol compound, a branched or linear diol compound having two hydroxyl groups and optionally a branched or linear triol compound having three hydroxyl groups may be used.

With regard to the branched or linear diol compound having two hydroxyl groups and the branched or linear triol compound having three hydroxyl groups which can be used as the polyol compound, examples thereof include an alkylene polyol compound, a carboxyl group-containing polyol compound, a polyoxyalkylene polyol compound, a polycarbonate polyol compound and a polycaprolactone polyol compound and each of them may be used solely or two or more thereof may be used jointly.

Specific examples of the branched or linear diol compound having two hydroxyl groups which can be used as a polyol compound are as follows:

an alkylene diol such as ethylene glycol, diethylene glycol, propylene glycol, 1,3-butanediol, 1,4-butanediol, 1,5-pentanediol, neopentyl glycol, 3-methyl-1,5-pentanediol, 1,6-hexanediol, 1,8-octanediol, 2-methyl-1,8-octanediol, 1,9-nonanediol, 1,10-decanediol, 1,4-cyclohexanediol or 1,4-cyclohexanedimethanol;

a carboxyl group-containing diol compound such as dimethylol propionic acid (2,2-bis(hydroxymethyl)propionic acid), dimethylol butanoic acid (2,2-bis(hydroxymethyl)-butanoic acid), 2,3-dihydroxybenzoic acid, 2,4-dihydroxybenzoic acid, 2,5-dihydroxybenzoic acid, 2,6-dihydroxybenzoic acid, 3,4-dihydroxybenzoic acid or 3,5-dihydroxybenzoic acid;

a polyoxyalkylenediol compound such as polyethylene glycol, polypropylene glycol, polytetramethylene glycol or a random copolymer of tetramethylene glycol with neopentyl glycol;

a polyester diol compound produced by reacting a polyhydroxyl alcohol with a polybasic acid;

a polycarbonate diol compound having a polycarbonate skeleton;

a polycaprolactone diol compound produced by a ring-opening addition reaction of a lactone such as γ-butyrolactone, ε-caprolactone or δ-valerolactone; and bisphenol A, an adduct of bisphenol A with ethylene oxide, an adduct of bisphenol A with propylene oxide, hydrogenated bisphenol A, an adduct of hydrogenated bisphenol A with ethylene oxide, an adduct of hydrogenated bisphenol A with propylene oxide, etc.

Each of them may be used solely or two or more thereof may be used jointly.

Specific examples of the branched or linear triol compound having three hydroxyl groups which can be used as a polyol compound are as follows:

trimethylolethane, polytrimethylolethane, trimethylolpropane, polytrimethylolpropane, pentaerythritol, polypentaerythritol, sorbitol, mannitol, arabitol, xylitol, galactitol, glycerol or polyethylene oxide, polypropylene oxide, a blocked copolymer or a random copolymer of ethylene oxide/propylene oxide synthesized by using such a polyhydric alcohol as a part of materials; a polyether polyol such as polytetramethylene glycol or a blocked copolymer or a random copolymer of tetramethylene glycol with neopentyl glycol; a polyester polyol which is a condensate of polyhydric alcohol or polyether polyol with a polybasic acid such as maleic acid anhydride, maleic acid, fumaric acid, itaconic acid anhydride, itaconic acid, adipic acid or isophthalic acid; and a polyhydric alcohol compound including a caprolactone modified polyol such as caprolactone modified polytetramethylene polyol, a polyolefin polyol, a polybutadiene polyol such as hydrogenated polybutadiene polyol and a polyol such as silicone polyol.

When such a branched or linear triol compound having three hydroxyl groups is used, a part of the resulting carboxyl group-containing polyimide can be branched. As a result, cross-linking density of the carboxyl group-containing polyimide increases whereby the durability of the cured coat can be improved. For further improvement of the cured coat as such, a branched or linear triol compound having three hydroxyl groups may be used upon necessity.

As to the polyol compound, a polycarbonate polyol compound can be used. When a polycarbonate polyol compound is used, it is preferred to be a polycarbonate diol compound. When the carboxyl group-containing polyimide of the present invention is used for the application as an electronic material, etc., high electric insulation, hydrolysis resistance, etc. can be achieved.

As hereunder, a process for the production of a polycarbonate diol compound will be exemplified although the present invention is not limited thereto.

A polycarbonate diol compound can be produced, for example, by the following reactions, etc.:

(i) Reaction of glycol or bisphenol with a carbonate; or
(ii) Reaction of glycol or bisphenol with phosgene in the presence of an alkali.

Specific examples of the carbonate produced by the above production process (i) include dimethyl carbonate, diethyl carbonate, diphenyl carbonate, ethylene carbonate and propylene carbonate.

As to the glycol or the bisphenol used in the above production processes (i) and (ii), examples thereof include ethylene glycol, propylene glycol, dipropylene glycol, diethylene glycol, triethylene glycol, butylene glycol, 3-methyl-1,5-pentanediol, 2-methyl-1,8-octanediol, 3,3'-dimethylolheptane, polyoxyethylene glycol, polyoxypropylene glycol, propanediol, 1,3-butanediol, 1,4-butanediol, 1,5-pentanediol, 1,6-hexanediol, 1,9-nonanediol, neopentyl glycol, octanediol, butyl ethyl pentanediol, 2-ethyl-1,3-hexanediol, cyclohexanediol, 1,4-cyclohexanedimethanol, a bisphenol such as bisphenol A or bisphenol F and a bisphenol where alkylene oxide such as ethylene oxide or propylene oxide is added to the above bisphenol. Each of those compounds may be used solely or two or more thereof may be used as a mixture.

As to the specific polycarbonate diol compound, Kuraray polyol C series manufactured by Kuraray and Duranol series manufactured by Asahi Kasei Chemicals are preferred and, among them, C-2090 (a polycarbonate diol manufactured by Kuraray: 3-methyl-1,5-pentanediol/1,6-hexanediol, number-average molecular weight=ca. 2,000), T5650E (a polycarbonate diol manufactured by Asahi Kasei Chemicals: 1,5-pentanediol/1,6-hexanediol, number-average molecular weight=ca. 500) and T5651 (a polycarbonate diol manufactured by Asahi Kasei Chemicals: 1,5-pentanediol/1,6-hexanediol, number-average molecular weight=ca. 1,000) are preferred.

As to the polyol compound, a polyester polyol compound may be used. When a polyester polyol compound is used, it is particularly preferred to be a polyester diol compound. To be more specific, OD-X-688 (aliphatic polyester diol manufactured by DIC: adipic acid/neopentyl glycol/1,6-hexanediol, number-average molecular weight=ca. 2,000), Vylon 220 (polyester diol manufactured by Toyobo, number-average molecular weight=ca. 2,000), etc. are preferred.

Number-average molecular weight of the polyol compound is preferred to be 100 to 30000, more preferred to be 200 to 20000, and most preferred to be 200 to 10000. When number-average molecular weight of the polyol compound is 100 to 30000, molecular weight of the carboxyl group-containing polyimide can be easily made particularly high. In addition, carboxylic group in an amount which is sufficient for making thermosetting can be introduced into the carboxyl group-containing polyimide. It is also possible to form a hard cured coat.

As a result of chain extension of a terminal acid anhydride group-containing imide prepolymer using a polyol compound, a carboxyl group-containing polyimide can be produced. When acid anhydride groups in the above terminal acid anhydride group-containing imide prepolymer are made to react with the hydroxyl groups of the polyol compound, a ring opening reaction of the terminal acid anhydride group-containing imide prepolymer proceeds. Thus, an ester bond is formed on one side while, on the other side, two carboxyl groups (residual carboxyl groups) can be formed in the main chain of the carboxyl group-containing polyimide. Due to the presence of the carboxyl groups as such, an excellent thermosetting property can be achieved when an oxirane ring-containing compound or the like is compounded in appropriate amount as a thermosetting agent.

A charging molar ratio of the terminal acid anhydride group-containing imide prepolymer to the polyol compound can be adjusted depending upon the molecular weight and the acid value of the aimed carboxyl group-containing polyimide.

The total compounding amount of the diisocyanate compound and the polyol compound is important in controlling the molecular weight of the carboxyl group-containing polyimide.

The molar ratio {A/(B+C)} of the tetracarboxylic acid dianhydride (A) to (the isocyanate compound and the polyol compound) (B+C) is preferred to be in such a ratio where A/(B+C) is from 60/100 to 99/100 or is from 140/100 to 101/100, more preferably A/(B+C) is from 75/100 to 99/100 or is from 125/100 to 101/100, further preferably A/(B+C) is from 85/100 to 99/100 or is from 115/100 to 101/100, and most preferably A/(B+C) is from 90/100 to 99/100 or is from 110/100 to 101/100.

When the molar ratio in terms of A/(B+C) is from 60/100 to 99/100 or is from 140/100 to 101/100, it is possible to give a high-molecular weight carboxyl group-containing polyimide where the heat resistance and the solubility in solvents are particularly well balanced. Accordingly, it is possible to give a carboxyl group-containing polyimide having excellent thermosetting property and having a viscosity suitable for easy handling. It is also possible to give a hard cured coat.

Number-average molecular weight of the carboxyl group-containing polyimide according to the present invention is preferred to be 3000 to 100000, more preferred to be 7000 to 100000, and most preferred to be 10000 to 100000. When the number-average molecular weight of the carboxyl group-containing polyimide is 3000 to 100000, it is possible to give a carboxyl group-containing thermosetting polyimide where the heat resistance and the solubility in solvents are particularly well balanced. Accordingly, it is possible to give a carboxyl group-containing polyimide having excellent thermosetting property and having a viscosity suitable for easy handling. It is also possible to give a hard cured coat.

To be more specific, the carboxyl group-containing polyimide according to the present invention is preferred to be such a one which is represented by the following formula [IV] or [V]:

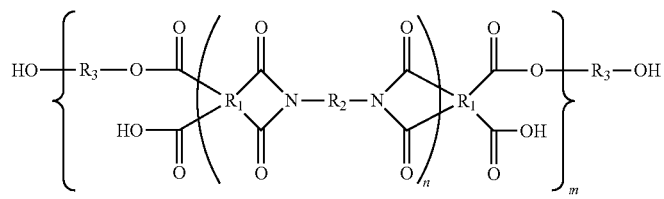

[IV]

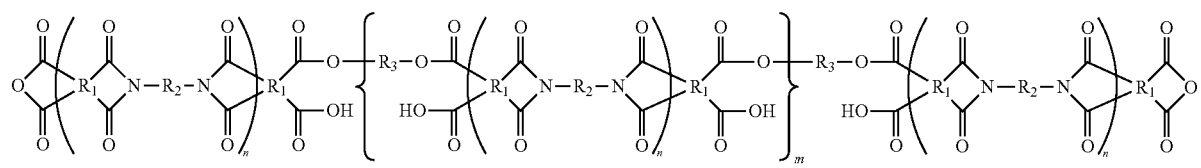

[V]

(In the formulae [IV] and [V], $R_1$ is an organic group after removal of a carboxyl group from an acid dianhydride compound represented by the following formula [II] and is an optionally substituted aromatic group, alicyclic group, aliphatic group or heterocycle-containing group having carbon number of 1 to 30. $R_2$ is a divalent organic group after removal of an isocyanate group from a diisocyanate compound represented by the following formula [III] and is an optionally substituted aromatic group, alicyclic group or aliphatic group having carbon number of 1 to 30. $R_3$ is an alkylene group having carbon number of 1 to 20 or a residue after removal of a hydroxyl group from a diol compound having at least one bond selected from the group consisting of ester bond, carbonate bond and ether bond. n and m each dependently is an integer and n is an integer of 1 to 30 while m is an integer of 1 to 200. $R_1$ and $R_2$ in the formulae [II] and [III] have the same meanings as $R_1$ and $R_2$ in the formulae [IV] and [V].)

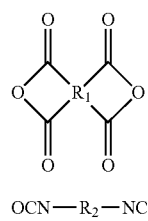

[II]

OCN—$R_2$—NCO   [III]

As hereunder, a process for the production of the carboxyl group-containing polyimide will be illustrated.

The reaction where the terminal acid anhydride group-containing imide prepolymer is subjected to chain extension using a polyol compound may also be conducted using a reactor equipped with stirrer and thermometer. The reaction is carried out in such a manner that the terminal acid anhydride group-containing imide prepolymer and the catalyst are dissolved in a solvent in the reactor and the polyol compound is added thereto followed by subjecting to polymerization. Polymerization temperature is preferred to be 60° C. to 150° C. Polymerization time can be appropriately selected depending upon the scale of the batch, upon the reaction condition to be adopted and particularly upon the reaction concentration.

An organic solvent used for the production of the carboxyl group-containing polyimide may be of the same type as that used for the production of the terminal acid anhydride group-containing imide prepolymer being mentioned already. Specific examples of the solvent as such include toluene, xylene, ethylbenzene, nitrobenzene, cyclohexane, isophorone, diethylene glycol dimethyl ether, ethylene glycol diethyl ether, propylene glycol methyl ether acetate, propylene glycol ethyl ether acetate, dipropylene glycol methyl ether acetate, diethylene glycol ethyl ether acetate, methyl methoxypropionate, ethyl methoxypropionate, methyl ethoxypropionate, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, N-ethylpyrrolidone, γ-butyrolactone, dimethyl sulfoxide, chloroform and methylene chloride. Preferably, the solvent is that which has a high solubility such as N,N-dimethylacetamide, N-methylpyrrolidone, N-ethylpyrrolidone or γ-butyrolactone. More preferably, the solvent is N,N-dimethylacetamide, or γ-butyrolactone. Most preferably, the solvent is γ-butyrolactone.

As to a reaction catalyst used for the production of the carboxyl group-containing polyimide, there may be exemplified amine, quaternary ammonium salt, imidazole, amide, pyridine, phosphine, organic metal salt, etc. More preferred ones are amine, pyridine and phosphine. To be more specific, there may be exemplified amine such as triethylamine or benzyldimethylamine; pyridine such as 4-dimethylaminopyridine; and phosphine such as triphenyl phosphine. Particularly preferred one is 4-dimethylaminopyridine Acid value of the carboxyl group-containing polyimide according to the present invention is preferred to be 250 to 2500 equivalents/$10^6$ g, more preferred to be 350 to 2200 equivalents/$10^6$ g, and most preferred to be 400 to 1900 equivalents/$10^6$ g. The acid value is derived from carboxyl groups (and corresponds to a carboxyl group equivalent). When acid value of the carboxyl group-containing polyimide is 250 to 2500 equivalents/$10^6$ g, a sufficient cross-linking structure is resulted and there are achieved particularly good thermosetting property, heat resistance, solvent resistance, flame retarding property, heat aging resistance, flexibility, etc. In addition, shrinking upon curing hardly happens.

The thermosetting resin composition of the present invention contains the above-mentioned carboxyl group-containing polyimide and an oxirane ring-containing compound as essential ingredients and may further contain phosphorus atom-containing inorganic filler and/or curing promoter as optional ingredient(s).

The thermosetting agent which can be used in the present invention is a compound having a functional group which can react with a carboxyl group of the carboxyl group-containing polyimide. For example, an oxirane ring-containing compound can be used as the thermosetting agent. There is no particular limitation for the oxirane ring-containing compound so far as the oxirane ring is contained in a molecule. Examples thereof include an epoxy group-containing compound such as epoxy resin of a novolak type and an oxetane group-containing compound such as oxetane resin of a novolak type.

Examples of the epoxy group-containing compound include epoxy resin of a bisphenol A type, epoxy resin of a hydrogenated bisphenol A type, epoxy resin of a bisphenol F type, epoxy resin of a bromated bisphenol A type, epoxy resin of a phenol novolak type, epoxy resin of an o-cresol novolak type, flexible epoxy resin, epoxy resin of an amine type, heterocycle-containing epoxy resin, alicyclic epoxy resin, epoxy resin of a bisphenol S type, epoxy resin of a dicyclopentadiene type, triglycidyl isocyanurate, epoxy resin of a bixylenol type and a glycidyl group-containing compound.

As to an oxetane group-containing compound, there is no particular limitation so far as it has an oxetane ring in a molecule and is curable. Examples thereof include 3-ethyl-3-hydroxymethyloxetane, 1,4-bis-{[(3-ethyl-3-oxetanyl)methoxy]methyl}benzene, 3-ethyl 3-(phenoxymethyl)-oxetane, di[1-ethyl(3-oxetanyl)]methyl ether, 3-ethyl-3-(2-ethylhexyloxymethyl)oxetane, 3-ethyl-3-{[3-(triethoxyl)-propoxy]methyl}oxetane, 3,3-bis(hydroxymethyl)oxetane, di[1-hydroxymethyl(3-oxetanyl)]methyl ether, 3,3-bis(hydroxymethyl)oxetane and oxetanyl-silsesquioxane.

Each of those compounds containing an oxirane ring may be used solely or two or more thereof may be used jointly. It is particularly preferred to use an epoxy compound having high reactivity and good thermosetting property.

The oxirane ring-containing compound as such may further contain an epoxy compound having only one epoxy group in a molecule as a diluent.

With regard to a method for adding the oxirane ring-containing compound as such, a compound containing oxirane ring to be added may be previously dissolved in the same solvent as a solvent contained in a carboxyl group-containing polyimide followed by adding or it may be directly added to a carboxyl group-containing polyimide.

In the thermosetting resin composition of the present invention, a cross-linking aid may be used together if necessary. Examples of the cross-linking aid as such include the compounds having glycidyl ether group, glycidyl ester group, glycidylamino group, benzyloxymethyl group, dimethylaminomethyl group, diethylaminomethyl group, dimethylolaminomethyl group, diethylolaminomethyl group, morpholinomethyl group, acetoxymethyl group, benzoyloxymethyl group, acetyl group, vinyl group, isopropenyl group, etc.

In addition, when the ratio of oxirane ring to carboxyl group participating in the thermal setting is adjusted, the thermosetting property can be set within a desired range. To be specific, the ratio of the oxirane ring to the carboxyl group in terms of oxirane ring/carboxyl group (molar ratio) is preferred to be from 5/1 to 1/5 and more preferred to be from 3/1 to 1/3. When the ratio is out of the above range, curing property and cross-linking property tend to become bad.

The using amount of the oxirane ring-containing compound may be determined by taking the application, etc. of the carboxyl group-containing polyimide of the present invention into consideration and, although there is no particular limitation therefor, the range of from 2 parts by weight to 100 parts by weight to 100 parts by weight of the carboxyl group-containing polyimide of the present invention is preferred and the range of from 3 parts by weight to 80 parts by weight is more preferred. Since the cross-linking density of a cured product prepared from the carboxyl group-containing polyimide of the present invention can be adjusted to an appropriate value when the oxirane ring-containing compound is used, various properties of the coat after curing can be much more enhanced. When the using amount of the oxirane ring-containing compound is less than 2 parts by weight, the cross-linking property becomes bad while, when it is more than 100 parts by weight, the cross-linking property also becomes bad whereby heat resistance, chemical resistance, solvent resistance, plating resistance, etc. may become bad.

In addition to the above-mentioned compound containing an oxirane ring, there is no particular limitation for a thermosetting agent in the present invention so far as it is a compound having a functional group which can react with hydroxyl group, carboxyl group, etc. Specific examples thereof include isocyanate compound, blocked isocyanate compound, cyanate ester compound, aziridine compound, acid anhydride group-containing compound, carboxyl group-containing compound, carbodiimide group-containing compound, benzoxazine compound, maleimide compound, citraconimide compound, nadimide compound, allylnadimide compound, vinyl ether compound, vinyl benzyl ether resin, thiol compound, melamine compound, guanamine compound, amino resin, phenol resin, alkyd resin, acrylic resin, unsaturated polyester resin, diallyl phthalate resin, silicone resin, xylene resin, furan resin, ketone resin, triallyl cyanurate resin, tris (2-hydroxyethyl)isocyanurate-containing resin, triallyl trimellitate-containing resin, dicyclopentadiene resin and thermosetting resin obtained by trimerization of an aromatic dicyanamide. Each of those compounds may be used solely or two or more thereof may be used jointly.

The phosphorus atom-containing organic filler is used for enhancing the flame retarding property. This organic filler has such properties that phosphorus content is high, efficiency of flame retarding property is high, hydrolysis hardly happens, hydrophobicity is exhibited and electric characteristic is not lowered. Therefore, as a result of using it, a thermosetting resin composition having excellent flame retarding property and electric insulating property can be prepared. In the present invention, the organic filler means that which is a finely powdered organic compound and is hardly soluble or is insoluble in organic solvents, water, etc.

It is desirable that the phosphorus atom-containing organic filler preferably comprises a phosphinate represented by the following formula [IV]:

[VI]

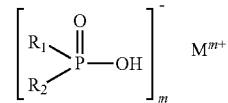

(In the formula [IV], $R_1$ and $R_2$ each independently is a linear or branched alkyl group having carbon number of 1 to 6 or an aryl group; M is Mg, Ca, Al, Sb, Sn, Ge, Ti, Fe, Zr, Zn, Ce, Bi, Sr, Mn, Li, Na, K or a protonated nitrogen base; and m is an integer of 1 to 4.)

As to the above organic filler containing phosphorus atom, there may be exemplified such a one which is selected from the group consisting of aluminum trisdiethylphosphinate, aluminum trismethylethylphosphinate, aluminum trisdiphenylphosphinate, zinc bisdiethylphosphinate, zinc bismethylethylphosphinate, zinc bisdiphenylphosphinate, titanyl bisdiethylphosphinate, titanium tetrakisdiethylphosphinate, titanyl bismethylethyl-phosphinate, titanium tetrakismethylethylphosphinate, titanyl bisdiphenylphosphinate, titanium tetrakisdiphenyl-phosphinate, etc. and a mixture of any of them. Among them, aluminum trisdiethylphosphinate is preferred.

Further, with regard to the phosphorus atom-containing organic filler, there may be exemplified an organophosphorus compound. Specific examples thereof include a commonly used organophosphorus compound such as phosphate compound, phosphonate compound, phosphinate compound, phosphine oxide compound, phosphorane compound or organic nitrogen-containing phosphorus compound and also a cyclic organophosphorus compound such as 9,10-dihydro-9-oxa-10-phosphaphenanthrene=10-oxide, 10-(2,5-dihydroxyphenyl)-10H-9-oxa-10-phosphaphenanthrene=10-oxide or 10-(2,7-dihydroxynaphthyl)-10H-9-oxa-10-phosphaphenanthrene=10-oxide as well as a derivative thereof being made to react with a compound such as epoxy resin or phenol resin. Among them, 10-(2,5-dihydroxyphenyl)-10H-9-oxa-10-phosphaphenanthrene=10-oxide is preferred.

Still further, with regard to the phosphorus atom-containing organic filler, there may be used, for example, a compound having a triazine skeleton. To be more specific, there may be exemplified melamine polyphosphate, melame polyphosphate and meleme polyphosphate.

A compound having a triazine skeleton is used as a flame retarding aid together with other organic filler containing phosphorus atom. As a result of the joint use of both, not only excellent flame retarding property can be achieved but also total using amount of the organic fillers containing phosphorus atom can be reduced and, as a result, that greatly contributes in low warpage and flexibility. The using amount of a compound having a triazine skeleton to 100 parts by weight in total of the organic fillers containing phosphorus atom is preferably 0 to 80 part(s) by weight and more preferably 10 to 70 part(s) by weight.

It is sufficient that the phosphorus atom-containing organic filler is hardly soluble or is insoluble in an organic solvent used for the present invention and there is no particular limitation therefor.

An average particle size of the phosphorus atom-containing organic filler is preferred to be 50 μm or smaller and more preferred to be 20 μm or smaller. When the average particle size is larger than the above range, surface area decreases as compared with the using amount and, due to insufficient dispersing, no sufficient flame retarding property can be achieved. It also may become a cause for significantly deteriorating the properties such as flexibility, adhesiveness and long-term reliability which have been conventionally demanded for a resist. Accordingly, it can be said to be better that the particle size is as smaller as possible. With regard to a method for giving such a particle size, it is acceptable that pulverization is previously conducted using a bead mill or the like or is conducted upon compounding with the resin using a three roll mill.

The using amount of the phosphorus atom-containing organic filler to 100 parts by weight of a carboxyl group-containing polyimide (A) is preferred to be 5 to 125 parts by weight and more preferred to be 10 to 100 parts by weight. When the using amount of the phosphorus atom-containing organic filler is too small, the flame retarding effect is insufficient while, when it is too much, adhesiveness to a base material, low warpage, flexibility, etc. tend to lower.

The content of phosphorus in the thermosetting resin composition of the present invention is preferred to be 0.3 to 10% by weight, more preferred to be 0.5 to 8.5% by weight, and most preferred to be 1 to 8% by weight. Accordingly, the adding amount of an oxirane ring-containing compound is adjusted so as to make the content of phosphorus within this range. When the content of phosphorus is less than the above range, no good flame retarding property can be achieved while, when it is more than that, mechanical characteristic, heat resistance, adhesiveness and insulation characteristic of the coat tend to become low.

The ratio by weight of the carboxyl group-containing polyimide, the oxirane ring-containing compound and the phosphorus atom-containing organic filler in the thermosetting resin composition of the present invention is preferred to be 30 to 95/1 to 50/2 to 55, more preferred to be 35 to 90/2 to 45/5 to 50, and most preferred to be 45 to 85/3 to 25/10 to 35. When the amount of the oxirane ring-containing compound exceeds the above range, the cross-linking property tends to become bad. When the amount of the phosphorus atom-containing organic filler is less than the above range, the flame retarding effect is insufficient while, when it is more than that, adhesiveness to the base material, low warpage, flexibility, etc. tend to become low.

The total weight of the carboxyl group-containing polyimide, the oxirane ring-containing compound and the phosphorus atom-containing organic filler in the thermosetting resin composition is preferred to be not less than 20% by weight. When the amount is less than the above range, the cross-linking property lowers whereby there may be the case where heat resistance, etc. become bad or flame retarding effect is insufficient.

In the carboxyl group-containing polyimide of the present invention, a curing promoter may be used so that the characteristic such as thermosetting property, heat resistance, adhesiveness, chemical resistance or solvent resistance can be much more enhanced. There is no particular limitation for the curing promoter so far as it can promote the above-mentioned curing reaction between the carboxyl group-containing polyimide and the oxirane ring-containing compound.

Examples of the curing promoter as such include imidazole derivatives; guanamines such as acetoguanamine and benzoguanamine; polyamines such as diaminodiphenylmethane, m-phenylenediamine, m-xylenediamine, diaminodiphenylsulfone, dicyandiamide, urea, urea derivatives, melamine and polybasic hydrazide; organic acid salts and/or epoxy adducts thereof; amine complex of boron trifluoride; triazine derivatives such as ethyldiamino-s-triazine, 2,4-diamino-s-triazine and 2,4-diamino-6-xylyl-s-triazine; tertiary amines such as trimethylamine, triethanolamine, N,N-dimethyloctylamine, N-benzyldimethylamine, pyridine, N-methylmorpholine, hexa(N-methyl)melamine, 2,4,6-tris(dimethylaminophenol), tetramethylguanidine, 1,8-diazabicyclo[5,4,0]-7-undecene (may also be called "DBU") and 1,5-diazabicyclo[4,3,0]-5-nonene (may also be called "DBN"); organic acid salts and/or tetraphenyl boroates thereof; polyvinylphenol; polyvinylphenol bromide; organic phosphines such as tributyl phosphine, triphenyl phosphine and tris-2-cyanoethyl phosphine; quaternary phosphonium salts such as tri-n-butyl (2,5-dihydroxyphenyl)phosphonium bromide, hexadecyltributyl phosphonium chloride and tetraphenyl phosphonium tetraphenyl boroate; quaternary ammonium salts such as benzyl trimethylammonium chloride and phenyl tributylammonium chloride; optical cationic polymerization catalysts such as the above polycarboxylic acid anhydride, diphenyl iodonium tetrafluoroboroate, triphenyl sulfonium hexafluoroantimonate, 2,4,6-triphenyl thiopyrylium hexafluorophosphate, Irgacure 261 (manufactured by Ciba Specialty Chemicals) and Optomer SP-170 (manufactured by Adeka); styrene-maleic acid anhydride resin; equimolar reaction product of phenyl isocyanate with dimethylamine; and equimolar reaction product of organic polyisocyanate such as tolylene diisocyanate or isophorone diisocyanate with dimethylamine. Each of them may be used solely or two or more thereof may be used jointly. Among them, a curing promoter having a latent curing property is preferred and examples thereof include organic acid salts and/or tetraphenyl boroates of DBU or DBN and photo-initiated cationic polymerization catalyst.

The using amount of the curing promoter to 100 parts by weight of an oxirane ring-containing compound is preferred to be 0 to 30 part(s) by weight. When the amount is more than 30 parts by weight, there is a possibility that the stability upon preservation of a carboxyl group-containing polyimide and the heat resistant and solvent resistance of the coat become low.

The using amount of the inorganic or organic filler to the total amount (say, 100% by weight) of nonvolatile matters in the thermosetting resin composition is preferred to be 1 to 25% by weight, more preferred to be 2 to 15% by weight, and most preferred to be 3 to 12% by weight. When the using amount of the inorganic or organic filler is less than 1% by weight, printability tends to become low while, when it is more than 25% by weight, mechanical characteristic such as flexibility and transparency of the coat tend to become low.

In the formation of a resist layer of a printed circuit board from the thermosetting resin composition of the present invention, it is preferred that, at first, a resist ink is prepared from the thermosetting resin composition of the present invention. To be more specific, the resist ink is prepared in such a manner that the carboxyl group-containing polyimide and the oxirane ring-containing compound are compounded in an appropriate ratio together, if necessary, with a phosphorus atom-containing organic filler and a curing promoter, and a solvent and, if further necessary, together with other compounding components followed by uniformly mixing using a roll mill, a mixer or the like. As to a mixing method, although there is no particular limitation provided that the sufficient dispersing is resulted, it is preferred to knead in plural times using a three roll mill.

As to a solvent used in preparing a resist ink, the same one as that which is used in the production of a carboxyl group-containing polyimide may be used.

Viscosity of the resist ink as measured by a B-type viscometer is preferred to be within a range of 50 dPa·s to 1000 dPa·s at 25° C. and more preferred to be within a range of 100 dPa·s to 800 dPa·s. When the viscosity is less than 50 dPa·s, bleeding of the resist ink after printing tends to become large and, at the same time, thickness of the coating layer tends to become thin. When the viscosity is more than 1000 dPa·s, transcription property of the resist ink to a base material upon printing lowers whereupon the blur is resulted and, at the same time, voids and pinholes in the printed coating layer tend to increase.

In order to enhance the workability during application and printing and the coat characteristics before and after formation of the coat, an inorganic filler or an organic filler containing no phosphorus atom may be added to the resist ink. There is no particular limitation for the filler as such so far as, for example, it forms a resist ink by dispersing in a solution of a carboxyl group-containing polyimide (A) and can impart thixotropy to the resist ink. Examples of the inorganic filler which can be used include silica ($SiO_2$), alumina ($Al_2O_3$), titania ($TiO_2$), tantalum oxide ($Ta_2O_5$), zirconia ($ZrO_2$), silicon nitride ($Si_3N_4$), barium titanate ($NaO.TiO_2$), barium carbonate ($BaCO_3$), lead titanate ($PbO.TiO_2$), lead titanate zirconate (PZT), lanthanum lead titanate zirconate (PLZT), gallium oxide ($Ga_2O_3$), spinel ($MgO.Al_2O_3$), mullite ($3Al_2O_3.2SiO_2$), cordierite ($2MgO.2Al_2O_3.5SiO_2$), talc ($3MgO.4SiO_2.H_2O$), aluminum titanate ($TiO_2$—$Al_2O_3$), yttria-containing zirconia ($Y_2O_3$—$ZrO_2$), barium silicate ($BaO.8SiO_2$), boron nitride (BN), calcium carbonate ($CaCO_3$), calcium sulfate ($CaSO_4$), zinc oxide (ZnO), magnesium titanate ($MgO.TiO_2$), barium sulfate ($BaSO_4$), organic bentonite and carbon (C). Each of them may be used solely or two or more thereof may be used jointly. In view of color tone, transparency, mechanical characteristic and thixotropy impartment of the resulting resist ink, fine particles of silica (such as that in a trade name Aerosil manufactured by Nippon Aerosil) are preferred.

As to the inorganic filler, that having the average particle size of 50 μm or smaller and having the maximum particle size of 100 μm or smaller is preferred, that having the average particle size of 20 μm or smaller is more preferred and that having an average particle size of 10 μm or smaller is most preferred. The average particle size (median size) used herein can be determined on the basis of volume using a particle size distribution measuring apparatus of a laser diffraction/scattering type. When the average particle size is more than 50 μm, a resist having sufficient thixotropy is hardly achieved and flexibility of the coat lowers. When the maximum particle size is more than 100 μm, appearance and adhesiveness of the coat tend to become insufficient.

Examples of the organic filler include polyimide resin particles, benzoguanamine resin particles and epoxy resin particles.

Upon necessity, the resist ink may further contain publicly known and commonly used additives including publicly known and commonly used coloring agent such as phthalocyanine blue, phthalocyanine green, iodine green, disazo yellow, crystal violet, titanium oxide, carbon black or naphthalene black; publicly known and commonly used polymerization inhibitor such as hydroquinone, hydroquinone monomethyl ether, tert-butylcatechol, pyrogallol or phenothiazine; publicly known and commonly used thickener such as Orben, Benton and montmorillonite; defoaming agent such as that of silicone type, fluorine type or polymer type; leveling agent; coupling agent/agent for imparting adhesiveness such as that of imidazole type, thiazole type and triazole type as well as organoaluminum compound, organotitanium compound and organosilan compound; flame retardant of phosphorus type such as triphenyl phosphate, tricresyl phosphate, trixylenyl phosphate, triethyl phosphate, cresyl diphenyl phosphate, xylenyl diphenyl phosphate, cresyl bis (2,6-xylenyl)phosphate, 2-ethylhexyl phosphate, dimethyl methyl phosphate, resorcinol bis(diphenol A) bis(dicresyl) phosphate, diethyl N,N-bis(2-hydroxyethyl)aminomethyl phosphate, phosphoric acid amide, organic phosphine oxide and red phosphorus; flame retardant of nitrogen-type such as ammonium polyphosphate, triazine, melamine cyanurate, succinoguanamine, ethylenedimelamine, triguanamine, triazinyl cyanurate, meleme, melame, tris(β-cyanoethyl)isocyanurate, acetoguanamine, guanylmelamine sulfate, meleme sulfate and melame sulfate; flame retardant of metal salt type such as potassium diphenylsulfone-3-sulfonate, metal salt of aromatic sulfonimide and alkali metal salt of polystyrenesulfonic acid; flame retardant of hydrated metal type such as aluminum hydroxide, magnesium hydroxide, dolomite, hydrotalcite, barium hydroxide, basic magnesium carbonate, zirconium hydroxide and tin oxide; flame retardant of inorganic type such as silica, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide, tungsten oxide, zinc borate, zinc metaborate, barium metaborate, zinc carbonate, magnesium carbonate, calcium carbonate, barium carbonate and zinc stannate; flame retardant/flame retardant aid such as silicone powder; thermostabilizing agent; antioxidant; and lubricant.

When a resist ink is used as a solder resist for example, the resist ink is applied to a flexible printed circuit board by a method such as a screen printing method, a spraying method, a roll coating method, an electrostatic coating method or a curtain coating method in a film thickness of 5 to 80 μm and the applied coat is preliminarily dried at 60 to 100° C. and then subjected to a main drying at 100 to 200° C. to cure. The drying may be conducted either in the air or in an inert atmosphere.

Besides as a solder resist, a resist ink is also useful as a coat-forming material for an overcoat in semiconductor elements and in various electronic parts and for an interlayer insulation coating layer and, in addition, it can be advantageously used as paints, coating agents, adhesives, etc. as well. Particularly, the thermosetting resin composition of the present invention can be advantageously used as a resist layer for a printed circuit board.

As hereunder, the flexible metal-clad laminate according to the present invention will be illustrated.

In the present invention, the term "flexible metal-clad laminate" is a laminate which is formed from metal foil and resin layer and, for example, it is a laminate being useful for the manufacture of a flexible printed circuit board. The term reading "flexible printed circuit board" in the present invention covers, for example, all of the so-called flexible printed circuit board (FPC), flat cable, board for tape automated bonding (TAB), board (chip on flexible board) for mounting TCP (tape carrier package), etc. which can be manufactured by subjecting to a circuit processing by a conventionally known method such as a subtractive method using a flexible metal-clad laminate followed, if necessary, by coating the conductive circuit using a coverlay film, a screen printing ink or the like either partially or totally.

The present invention relates to a flexible metal-clad laminate having at least a metal foil layer and a resin layer which is characterized in that said resin layer has been produced by thermosetting of a carboxyl group-containing polyimide having a specific structure.

Incidentally, the metal foil layer and the resin layer may be layered either directly or indirectly.

As to the metal foil for the flexible metal-clad laminate of the present invention, copper foil, aluminum foil, steel foil, nickel foil, etc. may be used. It is also possible to use a compounded metal foil prepared by compounding the above and also to use a metal foil which is further treated with other metal such as zinc or chromium compound. Among the above, copper foil is frequently used in general. Although there is no particular limitation for the thickness of the metal foil, a metal foil of 3 to 50 μm thickness can be advantageously used for example. Particularly for a purpose of fine circuit wiring, it is preferred that the thickness range is 3 to 12 μm and the surface roughness (Rz) of the applied surface is 0.5 to 2.0 μm. When each of the above characteristics of the copper foil is less than the lower limit value, peel strength (adhesive strength) becomes low while, when it is more than the upper limit, the fine circuit wiring tends to become difficult. Usually, the metal foil is in a shape of ribbon and there is no particular limitation for its length. Although there is also no particular limitation for the width of the ribbon-shaped metal foil, it is generally preferred to be about 25 to 300 cm or, particularly, about 50 to 150 cm. As to the copper foil, commercially available electrodeposited foil or rolled annealed foil may be used just as it is. Examples thereof include "HLS" manufactured by Nippon Denkai, "FO-WS" or "U-WZ" manufactured by Furukawa Circuit Foil and "NA-VLP" or "DFF" of Mitsui Metal Mining and Smelting.

The resin layer for the flexible metal-clad laminate of the present invention is prepared by thermosetting of a carboxyl group-containing polyimide having such a structure that a terminal acid anhydride group-containing imide prepolymer which is prepared by the reaction of an acid anhydride group in a tetracarboxylic acid dianhydride with an isocyanate group in a diisocyanate compound is subjected to chain extension via a polyol compound.

In preparing a resin layer by thermosetting of a carboxyl group-containing polyimide, the carboxyl group-containing polyimide may be used by dissolving in a solvent containing no basic compound such as an amine. Examples of the solvent as such include toluene, xylene, ethylbenzene, nitrobenzene, cyclohexane, isophorone, diethylene glycol dimethyl ether, ethylene glycol diethyl ether, propylene glycol methyl ether acetate, propylene glycol ethyl ether acetate, dipropylene glycol methyl ether acetate, diethylene glycol ethyl ether acetate, methyl methoxypropionate, ethyl methoxypropionate, methyl ethoxypropionate, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, N-ethylpyrrolidone, γ-butyrolactone, dimethyl sulfoxide, chloroform and methylene chloride. Preferably, the solvent is that which has a high solubility such as N,N-dimethylacetamide, N-methylpyrrolidone, N-ethylpyrrolidone or γ-butyrolactone. More preferably, the solvent is N,N-dimethylacetamide, or γ-butyrolactone. Most preferably, the solvent is γ-butyrolactone.

If necessary, for a purpose of improving various characteristics such as mechanical characteristic, electric characteristic, slippage, flame retarding property, etc. of the flexible metal-clad laminate or the flexible printed circuit board, the above carboxyl group-containing polyimide solution may be used together with other resin, organic compound or inorganic compound by means of mixing therewith or being made to react therewith. For example, lubricant (such as silica, talc or silicone), adhesion promoter, flame retardant (such as that of a phosphate or triazine type or aluminum hydroxide), stabilizer (such as antioxidant, ultraviolet absorber or polymerization inhibitor), plating activator, organic or inorganic filler (such as talc, titanium oxide, silica, fine particles of a fluorine type polymer, pigment, dye or calcium carbide) and others including resin and organic compound (such as silicone compound, fluorine compound, isocyanate compound, blocked isocyanate compound, acrylic resin, urethane resin, polyester resin, polyamide resin, epoxy resin or phenol resin) or curing agent therefor as well as inorganic compound (such as silicon oxide, titanium oxide, calcium carbonate or iron oxide) within such an extent that they do not deteriorate the object of the present invention. If necessary, it is also possible to add a catalyst for the polyimidization such as aliphatic tertiary amine, aromatic tertiary amine, heterocyclic tertiary amine, aliphatic acid anhydride, aromatic acid anhydride or hydroxyl compound. Preferred examples thereof include triethylamine, triethylenediamine, dimethylaniline, pyridine, picoline, isoquinoline, imidazole, undecene and hydroxyacetophenone. Particularly preferred ones are pyridine compound, imidazole compound and undecene compound. Among them, benzimidazole, triazole, 4-pyridinemethanol, 2-hydroxypyridine and diazabicyclo-[5.4.0]undecene-7 are preferred, and 2-hydroxypyridine and diazabicyclo-[5.4.0] undecene-7 are more preferred.

Although there is no particular limitation for the method of manufacturing the flexible metal-clad laminate of the present invention, there may be exemplified a method where a carboxyl group-containing polyimide solution is applied to a metal foil either directly or indirectly via an adhesive layer and the applied coat is dried (initial drying) followed, if necessary, by subjecting to a thermal treatment to remove the solvent (secondary drying).

As to a method for the application, there is no particular limitation therefor but the methods which have been well-known hitherto may be used. For example, viscosity of the carboxyl group-containing polyimide solution is adjusted and the solution is then applied to the metal foil either directly or via an adhesive layer using roll coater, knife coater, doctor coater, blade coater, gravure coater, die coater, reverse coater or the like. There is no particular limitation for the composition of the adhesive when the layering is done via an adhesive layer and, although there may be used adhesives of acrylonitrile butadiene rubber (NBR) type, polyamide type, polyester type, polyester urethane type, epoxy resin type, acrylic resin type, polyimide resin type, polyamide imide resin type, polyester imide type and the like, the preferred ones in view of heat resistance, adhesive property, flexion resistance property, etc. are those of polyimide resin type and of polyamide imide type and a resin composition where epoxy resin is compounded with those resins. Thickness of the adhesive layer is preferred to be about 5 to 30 μm. Further, for a purpose of improving various characteristic properties of flexible printed circuit board after the carboxyl group-containing polyimide solution is applied to the metal foil either directly or via an adhesive layer or is applied followed by drying, it is also possible to further apply the above-mentioned adhesive. Composition and thickness of the adhesive are the same as those mentioned hereinabove in view of heat resistance, adhesive property, flexion resistance characteristic, curing property of flexible printed circuit board, etc. With regard to the conditions for applying and drying, the same conditions as those in the case of the carboxyl group-containing polyimide solution may be adopted.

Although there is no particular limitation for the drying condition after the application, it is usually preferred that the initial drying is conducted at the temperature which is lower than the boiling point (Tb (° C.)) of the solvent used for the carboxyl group-containing polyimide solution to an extent of 70 to 130° C. and, after that, further drying (secondary drying) is conducted at the temperature which is near the boiling point of the solvent or at the temperature which is not lower than the boiling point.

When the initial drying temperature is higher than (Tb−70)° C., foams may be generated on the applied surface or unevenness of the residual solvent in the thickness direction of the resin layer may become high. Therefore, the warpage (curl) may be resulted in the flexible metal-clad laminate whereby the warpage of the flexible printed circuit board prepared by a circuit processing thereof may also become large.

When the drying temperature is lower than (Tb−130) ° C., time for the drying becomes long and productivity lowers. Although the initial drying temperature varies depending upon the type of the solvent, it is usually about 60 to 150° C. and preferably about 80 to 120° C. Time required for the initial drying is usually that by which the residual rate of the solvent in the coat under the above temperature condition becomes about 5 to 40% and, usually, it is preferred to be about 1 to 30 minute(s) and more preferred to be about 2 to 15 minutes.

There is also no particular limitation for the secondary drying condition and, although the drying may be conducted at the temperature of near the boiling point of the solvent or at the temperature of not lower than the boiling point, it is usually preferred to be at 120° C. to 400° C. and more preferred to be at 200° C. to 300° C. When the temperature is lower than 120° C., time for drying becomes long and productivity lower while, when it is higher than 400° C., deterioration reaction may proceed in some resin compositions whereby the resin film may become fragile. Time required for the secondary drying is usually that by which the residual rate of the solvent in the coat under the above temperature condition becomes zero and, usually, it is about several minutes to several tens hours.

The drying may be carried out under an inert gas atmosphere or in vacuo. As to the inert gas, there may be exemplified nitrogen, carbon dioxide, helium and argon and it is preferred to use nitrogen which is easily available. When the drying is conducted in vacuo, it is preferred to be done under the pressure of about $10^{-5}$ to $10^3$ Pa and more preferred to be done under the pressure of about $10^{-1}$ to 200 Pa.

Although the drying method is not particularly limited both in the initial and the secondary dryings, it may be carried out by means of a conventionally known method such as a roll support method or a floating method. It is also possible to carry out a continuous thermal treatment using a heating furnace such as that of a tenter type or a thermal treatment using an oven of a batch system after winding in a rolled state. In the case of a batch system, it is preferred to wind in such a manner that the applied surface and the non-applied surface do not contact with each other. As to the heating means, the conventionally known ones such as electric furnace, IR heater and far-infrared heater may be used.

There is no particular limitation for the composition of the adhesive when the laminating is done via an adhesive layer and, although there may be used adhesives of acrylonitrile butadiene rubber (NBR) type, polyamide type, polyester type, polyester urethane type, epoxy resin type, acrylic resin type, polyimide resin type, polyamide imide resin type, polyester imide type and the like, the preferred ones in view of heat resistance, adhesive property, flexion resistance property, etc. are those of polyimide resin type and of polyamide imide type and a resin composition where epoxy resin is compounded with those resins. Thickness of the adhesive layer is preferred to be about 5 to 30 μm. In view of the insulation property, etc., a polyester or a polyester urethane resin type or a resin composition where epoxy resin is compounded with such a resin is preferred and thickness of the adhesive layer is preferred to be about 5 to 30 μm. Although there is no particular limitation for the thickness of the adhesive so far as there is no problem for achieving the properties of the flexible printed circuit board, sufficient adhesion may be hardly achieved when the thickness is too thin while, when it is too thick, processing ability (drying property and applying property) may lower.

When the above-mentioned flexible metal-clad laminate of the present invention is used and subjected to a circuit processing by, for example, means of a subtractive method, a flexible printed circuit board can be manufactured. When the circuit surface is coated for a purpose of protecting from solder resist of conductor circuit or from dirt or scratch, there may be adopted, for example, a method where a heat resisting film such as polyimide film is laminated to a wiring board (a base board where conductor circuit is formed) using an adhesive by a conventionally known method or a method where a liquid coating agent is applied to a wiring board by a screen printing method. As to the liquid coating agent, the conventionally known ink of an epoxy type or a polyimide type may be used and a polyimide type one is preferred. It is also possible that an adhesive sheet of an epoxy type or a polyimide type is directly adhered to a wiring board.

The flexible metal-clad laminate of the present invention can satisfy thermosetting property, peel strength, PCT resistance and solvent resistance at the same time. Accordingly, a flexible printed circuit board (FPC) using the flexible metal-clad laminate of the present invention can be advantageously used for electronic instruments, electronic parts, automobile parts, electric appliances, etc. Further, a flexible printed circuit board (FPC) using the flexible metal-clad laminate of the present invention can be advantageously used for flat cable, board for tape automated bonding (TAB), board (chip on flexible board) for mounting TCP (tape carrier package), etc.

EXAMPLES

As hereunder, the present invention will be illustrated by way of Examples although the present invention is not limited to those Examples only. Evaluations of the characteristic values in each Example were conducted according to the following methods.

<Composition of the Resin>

A sample (15 mg) such as a terminal acid anhydride group-containing imide prepolymer and a carboxyl group-containing polyimide was dissolved in 0.6 ml of deuterated dimethyl sulfoxide and subjected to $^1$H-NMR analysis using a Fourier transform nuclear magnetic resonance spectrometer (Biospin AVANCE 500 manufactured by Bruker) and, from its integral ratio, molar ratio was determined.

<Number-Average Molecular Weight>

A sample such as a terminal acid anhydride group-containing imide prepolymer and a carboxyl group-containing polyimide was dissolved in and/or diluted with tetrahydrofuran so as to make the resin concentration about 0.5% by weight and filtered through a membrane filter made of poly(tetrafluorinated ethylene) having a pore diameter of 0.5 µm. The resulting one was used as a sample for the measurement and its molecular weight was measured by means of gel permeation chromatography (GPC) using tetrahydrofuran as a mobile phase and a differential refractometer as a detector. Flow rate was made 1 mL/minute and column temperature was made 30° C. As to the column, KF-802, 804L and 806L manufactured by Showa Denko were used. As a standard for the molecular weight, monodispersed polystyrene was used.

<Acid Value>

A sample (0.2 g) such as a carboxyl group-containing polyimide was dissolved in 20 ml of N-methylpyrrolidone and titrated with 0.1N ethanolic solution of potassium hydroxide to determine the equivalence per $10^6$ g of the sample such as a carboxyl group-containing resin (equivalents/$10^6$ g).

<Thermosetting Property>

A compounded product comprising a carboxyl group-containing polyimide, a thermosetting agent and a curing promoter was applied onto a glossy surface of electrodeposited copper foil of 18 µm thickness so that the thickness after drying was made 20 µm and then dried at 80° C. for 10 minutes. After that, a heating treatment was conducted at 120° C. for 1 hour to give a laminate in which a cured coating layer was formed (Hereinafter, it will be referred to as "the laminate".). The laminate was cut into a size of 2.5 cm×10 cm and used as a test piece.

The test piece was dipped in N-methylpyrrolidone (NMP) for 60 minutes, the masses of the test piece before and after the dipping were measured and the residual rate of the mass was adopted as a gel fraction.

Gel fraction (% by mass)={[(Mass after dipping into NMP)−(Mass of electrodeposited copper foil)]/ [(Mass before dipping into NMP)−(Mass of electrodeposited copper foil)]}×100

<PCT Resistance>

A test piece prepared by cutting the resulting laminate into a size of 2.5 cm×10 cm was subjected to a heat resisting treatment for 24 hours under the condition of 121° C.×100% RH×1.2 atm and an observation was conducted whether any abnormal appearance such as peeling or swelling of the cured coating layer was noted.

(Judgment)

○: No abnormal appearance was noted.

Δ: Abnormal appearance was noted slightly.

x: Abnormal appearance was noted on the whole surface.

<Solvent Resistance>

A test piece prepared by cutting the resulting laminate into a size of 2.5 cm×10 cm was subjected to a rubbing test using a gauze felt dipped with methyl ethyl ketone and a load of 500 g. Frequencies or time(s) (one going-and-returning was counted as one time and the upper limit was 100 times) until the cured coating layer was peeled off were evaluated according to the following standard.

(Judgment)

○: No peeling was noted even by 100 times or more and no change was noted in the cured coat.

Δ: Although no peeling was noted even by 100 times or more, scratch or the like was observed in the cured coat.

x: The cured coat was peeled off by 100 times or less.

<Peel Strength>

A compounded product comprising a carboxyl group-containing polyimide, a thermosetting agent and a curing promoter was applied onto a polyimide film (Apical manufactured by Kaneka) of 25 µm thickness so that the thickness after drying was made 20 µm and then dried at 80° C. for 10 minutes. After that, it was dried at 120° C. for 3 minutes. When the adhesive film prepared as such was laminated to an electrodeposited copper foil of 18 µm thickness, the glossy surface of the electrodeposited copper foil was made to contact to the adhesive followed by pressing for 30 seconds under the pressure of 35 kgf/cm$^2$ at 160° C. to adhere. After that, a heating treatment was conducted at 120° C. for 1 hour to prepare a sample for evaluating the peel strength. The resulting sample was subjected to a 90° peeling test at 25° C. under a tensile speed of 50 mm/min to measure the peel strength (N/cm).

<Phosphorus Atom Concentration (Percentage of Phosphorus Contained Therein)>

A sample was weighed in an Erlenmeyer flask corresponding to the phosphorus concentration of the sample, then 3 ml of sulfuric acid, 0.5 ml of perchloric acid and 3.5 ml of nitric acid were added thereto and a gradual thermal decomposition was conducted using an electric heater during one half day. After the solution became transparent, it was further heated to generate white fume of sulfuric acid and allowed to cool down to room temperature, the resulting decomposed solution was transferred to a 50-ml measuring flask, 5 ml of 2% ammonium molybdate solution and 2 ml of 0.2% hydrazine sulfate solution were added thereto and the mixture was diluted with pure water in the measuring flask followed by well mixing. The measuring flask was dipped in a boiling water bath for 10 minutes whereby the solution therein was heated to colorize, cooled with water down to room temperature and deaerated by means of ultrasonic wave, the solution was then placed in an absorption cell of 10 mm and absorbance was measured using a spectrophotometer (wave length: 830 nm) using a blank test solution as a control. Amount (% by weight) of phosphorus contained therein was determined from the previously-prepared calibration curve and the concentration of phosphorus atoms (percentage of phosphorus contained therein) in the sample was calculated.

<Flame Retarding Property>

A resist ink was applied to a polyimide film (Apical NPI manufactured by Kaneka) of 25 μm thickness and dried at 80° C. for 5 minutes to prepare a dried coat (thickness: 15 μm). After that, a heating treatment was carried out at 120° C. for 1 hour. The resulting layered film was evaluated for its flame retarding property in accordance with the UL 94 standard. The flame retarding property in the UL 94 standard is preferably not less than VTM-1 and is most preferably VTM-0.

<Solder Dip Resistance>

After a resist ink was applied to an electrodeposited copper foil, it was dried at 80° C. for 5 minutes to prepare a dried coat (thickness: 15 μm). After that, it was subjected to a heating treatment at 120° C. for 1 hour to prepare a resist coating layer laminate (Hereinafter, the product prepared in the same manner will be referred to as a resist coating layer laminate.). This resist coating layer laminate was applied with a rosin-type flux EC-19S-10 (manufactured by Tamura Kaken), dipped in a solder bath of 280° C. for 30 seconds in accordance with JIS-C6481 and evaluated, in accordance with the following standard, whether abnormal appearance such as peeling and swelling was noted.

○: No abnormal appearance was noted.
Δ: Abnormal appearance was noted slightly.
x: Abnormal appearance was noted on the whole surface.

<Heat Aging Resistance>

The above resist coating layer laminate was floated for 1 hour on a solder bath of 250° C. so that the resist side was made outward and was evaluated, in accordance with the following standard, whether abnormal appearance such as peeling and swelling was noted.

○: No abnormal appearance was noted.
Δ: Abnormal appearance was noted slightly.
x: Abnormal appearance was noted on the whole surface.

<Flexibility>

The above resist coating layer laminate was evaluated in accordance with JIS-K5400. Diameter of the shaft was made 2 mm and the fact whether or not the crack was generated was evaluated in accordance with the following standard.

○: No crack generation was noted.
x: Crack generation was noted.

Synthetic Example 1-1

To a four-necked flask equipped with stirrer and thermometer were added 389.8 parts by weight of ethylene glycol bis(trimellitic acid anhydride) (TMEG) as a tetracarboxylic acid dianhydride and 1230.6 parts by weight of γ-butyrolactone as a solvent followed by stirring and dissolving at 120° C. To the above was added 137.6 parts by weight of 4,4'-diphenylmethane diisocyanate (MDI) as a diisocyanate compound followed by stirring. Then 0.1 part by weight of 1,8-diazabicyclo[5.4.0]-7-undecene (DBU) was added hereto as a catalyst and the reaction was carried out in a nitrogen stream at 120° C. for 3 hours. After that, the above was cooled down to room temperature to give a terminal acid anhydride group-containing imide prepolymer having the solid concentration of 30% by weight. Composition and number-average molecular weight of this prepolymer are shown in Table 1.

After that, the resulting terminal acid anhydride group-containing imide prepolymer having the solid concentration of 30% by weight was heated up to 100° C. and stirred and 225.0 parts by weight of a polycarbonate diol compound (Duranol T5650E manufactured by Asahi Kasei Chemicals; Mn=500) as a polyol compound and 50.5 parts by weight of γ-butyrolactone were added thereto followed by stirring. Then 2.4 parts by weight of 4-dimethylaminopyridine (DMAP) was added thereto as a catalyst and the reaction was conducted at 100° C. for 8 hours. After that, the above was cooled down to room temperature to give a carboxyl group-containing polyimide (1-1) having the solid concentration of 37% by weight. Composition and properties of this resin are shown in Table 1. Further, $^1$H-NMR spectrum of the carboxyl group-containing thermosetting polyimide (1-1) obtained in Synthetic Example 1-1 is shown in FIG. 1.

Synthetic Examples 1-2, 1-7

Figure 2:
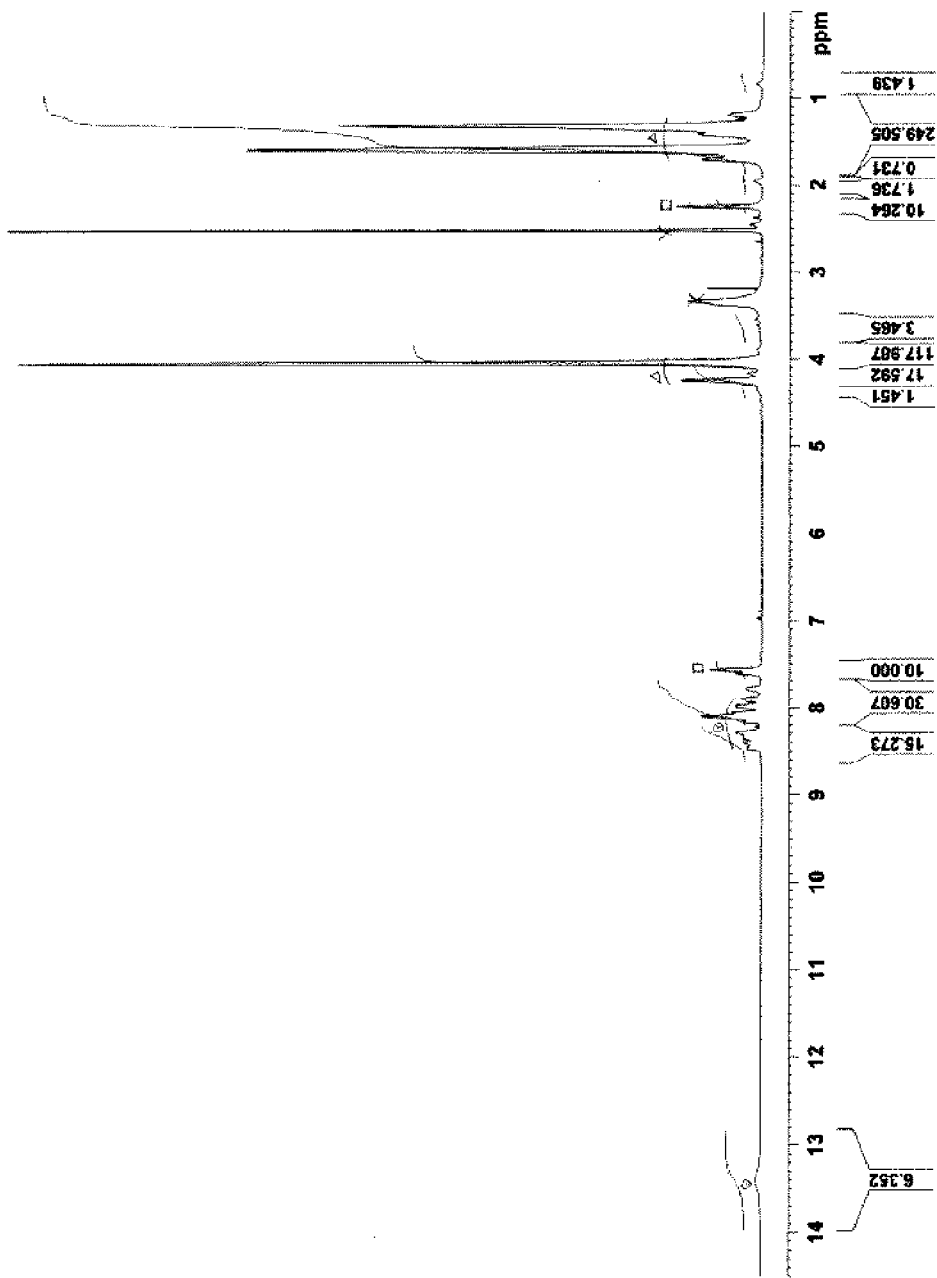
FIG. 2 shows $^1$H-NMR spectra of the carboxyl group-containing thermosetting polyimides (1-2, 1'-2 and 1"-2) produced by Synthetic Examples 1-2, 1'-2 and 1"-2.

The same operation as in Synthetic Example 1-1 was conducted except that the compositions of the materials were changed as shown in Table 1, tetracarboxylic acid dianhydride was dissolved in a solvent at 180° C. and the reaction condition with a diisocyanate compound was made at 180° C. for 3 hours whereupon various carboxyl group-containing polyimides were produced. Composition and properties of these resins are shown in Table 1. Further, $^1$H-NMR spectrum of the carboxyl group-containing thermosetting polyimide (1-2) obtained in Synthetic Example 1-2 is shown in FIG. 2.

Synthetic Examples 1-3, 1-4, 1-5, 1-6

The same operation as in Synthetic Example 1-1 was conducted except that the compositions of the materials were changed as shown in Table 1 whereupon various carboxyl group-containing polyimides were produced. Composition and properties of these resins are shown in Table 1.

TABLE 1

| | | | | | Synthetic Example | | | | | | |
|---|---|---|---|---|---|---|---|---|---|---|---|
| | carboxyl group-containing polyimide | | | | 1-1 | 1-2 | 1-3 | 1-4 | 1-5 | 1-6 | 1-7 |
| composition (molar ratio) | terminal acid anhydride group-containing imide prepolymer | tetracarboxylic acid dianhydride (A) | TMEG | | 95 | | | | | 117 | |
| | | | BPDA | | | 91 | | | | | 65 |
| | | | PMDA | | | | 78 | | | | |
| | | | BTDA | | | | | 84 | | | 41 |
| | | | ODPA | | | | | | 87 | | |
| | | diisocyanate compound (B) | MDI | | 55 | | | | | 35 | |
| | | | TDI | | | 50 | 30 | 57 | 50 | 20 | 45 |
| | | number-average molecular weight (Mn) | | | 1300 | 950 | 600 | 1600 | 1350 | 900 | 750 |

TABLE 1-continued

| carboxyl group-containing polyimide | | Synthetic Example | | | | | | |
|---|---|---|---|---|---|---|---|---|
| | | 1-1 | 1-2 | 1-3 | 1-4 | 1-5 | 1-6 | 1-7 |
| polyol compound (C) | C-2090 | | | 27 | | | | |
| | T5650E | 45 | | 43 | 20 | 25 | 45 | 12 |
| | T5651 | | 50 | | | | | 43 |
| | OD-X-688 | | | | 23 | | | |
| | Vylon 220 | | | | | 25 | | |
| properties | A/(B + C) molar ratio | 95/100 | 91/100 | 78/100 | 84/100 | 87/100 | 117/100 | 106/100 |
| | number-average molecular weight (Mn) | 22000 | 18000 | 11000 | 13500 | 15300 | 13000 | 19000 |
| | resin acid value (equivalents/$10^6$ g) | 1110 | 1010 | 1060 | 640 | 810 | 1550 | 1410 |

Meanings of the abbreviations in Table 1 are shown as follows.
TMEG: Ethylene glycol bis(trimellitic acid anhydride)
PMDA: Pyromellitic acid dianhydride
BPDA: 3,3',4,4'-Diphenyltetracarboxylic acid dianhydride
BTDA: 3,3',4,4'-Benzophenonetetracarboxylic acid dianhydride
ODPA: 4,4'-Oxydiphthalic acid dianhydride
MDI: 4,4'-Diphenylmethane diisocyanate
TDI: 2,4-Toluene diisocyanate
C-2090: Polycarbonate diol manufactured by Kuraray (3-methyl-1,5-pentanediol/1,6-hexanediol), number-average molecular weight = ca. 2,000
T5650E: Polycarbonate diol manufactured by Asahi Kasei Chemicals (1,5-pentanediol/1,6-hexanediol), number-average molecular weight = ca. 500
T5651: Polycarbonate diol manufactured by Asahi Kasei Chemicals (1,5-pentanediol/1,6-hexanediol), number-average molecular weight = ca. 1,000
OD-X-688: Aliphatic polyester diol manufactured by DIC (adipic acid/neopentyl glycol/1,6-hexanediol), number-average molecular weight = ca. 2,000
Vylon 220: Polyester diol manufactured by Toyobo, number-average molecular weight = ca. 2,000

Comparative Synthetic Example 2-1

In a four-necked flask equipped with stirrer and thermometer, 50 parts by weight of polybutadiene having terminal OH group (G-3000 manufactured by Nippon Soda; Mn=3000) as a polyol compound was dissolved in 23.5 parts by weight of γ-butyrolactone as a solvent and stirred and dissolved at 50° C. 2,4-Toluene diisocyanate (TDI) (4.8 parts by weight) was added thereto as a diisocyanate compound and stirred therewith. To this was added 0.007 part by weight of dibutyl tin dilaurate as a catalyst and the reaction was conducted for 5 hours. Then the above was cooled down to room temperature. After that, 8.83 g of 3,3',4,4'-benzophenonetetracarboxylic acid dianhydride (BTDA) as a tetracarboxylic acid dianhydride, 0.07 g of triethylenediamine as a catalyst and 4.09 parts by weight of γ-butyrolactone as a solvent were added thereto followed by stirring and the reaction was conducted at 130° C. for 6 hours. Further, 1.43 parts by weight of 2, 4-toluene diisocyanate (TDI) was added thereto followed by stirring and the reaction was conducted at 130° C. for 6 hours. After that, it was cooled down to room temperature to give a resin (2-1) having solid concentration of 40% by weight. Composition and properties of the resulting resin are shown in Table 2.

Comparative Synthetic Example 2-2

In a four-necked flask equipped with stirrer and thermometer, 1000 parts by weight of polycarbonate diol compound (PLACCEL CD-220 manufactured by Daicel Chemical; Mn=2000) as a polyol compound was dissolved in 833.5 parts by weight of γ-butyrolactone as a solvent and stirred at 65° C. to dissolve. 4,4'-Diphenylmethane diisocyanate (MDI) (250.3 parts by weight) was added thereto as a diisocyanate compound followed by stirring and the reaction was conducted at 140° C. for 5 hours. Then 288.2 parts by weight of trimellitic acid anhydride as a carboxylic acid anhydride, 125.1 parts by weight of 4,4'-diphenylmethane diisocyanate (MDI) as a diisocyanate compound and 1361 parts by weight of γ-butyrolactone as a solvent were added thereto followed by stirring and the reaction was conducted at 160° C. for 6 hours. After that, the above was cooled down to room temperature to give a resin (2-2) having solid concentration of 54% by weight. Composition and properties of the resulting resin are shown in Table 2.

Comparative Synthetic Example 2-3

To a four-necked flask equipped with stirrer and thermometer were added 1.86 parts by weight of ethylene glycol as a polyol compound, 49.8 parts by weight of silicon diamine (KF-8010 manufactured by Shinetsu Silicone; Mn=830) as a diamine compound and 41.0 parts by weight of ethylene glycol bis(trimellitic acid anhydride) (TMEG) as a tetracarboxylic acid dianhydride and the mixture was heated up to 180° C. and made to react in a nitrogen stream for 1.5 hours. Then 139.0 parts by weight of γ-butyrolactone was added thereto as a solvent to dissolve. After that, the above was cooled down to room temperature to give a resin (2-3) having solid concentration of 40% by weight. Composition and properties of the resulting resin are shown in Table 2.

TABLE 2

| | resin | | Comparative Synthetic Example | | |
|---|---|---|---|---|---|
| | | | 2-1 | 2-2 | 2-3 |
| composition (parts by weight) | polyol compound | G-3000 | 50 | | |
| | | PLACCEL CD-220 | | 1000 | |
| | | ethylene glycol | | | 1.86 |
| | diamine compound | KF-8010 | | | 49.8 |
| | diisocyanate compound | TDI | 6.23 | | |
| | | MDI | | 375.4 | |
| | carboxylic acid anhydride | BTDA | 8.83 | | |
| | | TMEG | | | 41 |
| | | TMA | | 288.2 | |

TABLE 2-continued

| | resin | Comparative Synthetic Example | | |
|---|---|---|---|---|
| | | 2-1 | 2-2 | 2-3 |
| properties | number-average molecular weight (Mn) | 12000 | 18000 | 3200 |
| | resin acid value (equivalents/$10^6$ g) | 175 | 400 | 1100 |

Meanings of the abbreviations in Table 2 are shown as follows.
G-3000: Polybutadiene having terminal OH group manufactured by Nippon Soda, number-average molecular weight = ca. 3,000
PLACCEL CD-220: Polycarbonate diol manufactured by Daicel Chemical, number-average molecular weight = ca. 2,000
KF-8010: Silicon diamine manufactured by Shinetsu Silicone, number-average molecular weight = ca. 830
TDI: 2,4-Toluene diisocyanate
MDI: 4,4'-Diphenylmethane diisocyanate
BTDA: 3,3',4,4'-Benzophenonetetracarboxylic acid dianhydride
TMEG: Ethylene glycol bis(trimellitic acid anhydride)
TMA: Trimellitic acid anhydride Example 1

To 100 parts by weight of the resin of the carboxyl group-containing polyimide (1-1) prepared in Synthetic Example 1 was added 39 parts by weight of HP-7200 (trade name of an epoxy resin of a dicyclopentadiene type manufactured by DIC) followed by diluting with γ-butyrolactone. Further, 1.4 parts by weight of UCAT-5002 (manufactured by San-Apro) as a curing promoter was added thereto followed by well stirring using a paint shaker to give a compounded product comprising the carboxyl group-containing polyimide of the present invention. The resulting compounded product was applied onto a glossy side of electrodeposited copper foil of 18 μm thickness and a polyimide film (Apical manufactured by Kaneka) so as to make the thickness after drying 20 μm. After drying with hot air of 80° C. for 10 minutes, heating was conducted at 120° C. for 60 minutes in an air atmosphere to give a laminate in which a cured coat was formed. Composition and coat properties of the resulting compounded product are shown in Table 3.

Examples 2 to 9, Comparative Examples 1 to 3

The same operation as in Example 1 was conducted except that the composition was changed as mentioned in Table 3 whereupon the compounded products were prepared and the laminates in which a cured coat was formed were obtained. Composition and coat properties of the resulting compounded product are shown in Table 3.

TABLE 3

| compounded product | | | Example | | | | | | | | | Comparative Example | | |
|---|---|---|---|---|---|---|---|---|---|---|---|---|---|---|
| | | | 1 | 2 | 3 | 4 | 5 | 6 | 7 | 8 | 9 | 1 | 2 | 3 |
| composition (parts by weight) | resin | 1-1 | 100 | 100 | 100 | | | | | | | | | |
| | | 1-2 | | | | 100 | | | | | | | | |
| | | 1-3 | | | | | 100 | | | | | | | |
| | | 1-4 | | | | | | 100 | | | | | | |
| | | 1-5 | | | | | | | 100 | | | | | |
| | | 1-6 | | | | | | | | 100 | | | | |
| | | 1-7 | | | | | | | | | 100 | | | |
| | | 2-1 | | | | | | | | | | 100 | | |
| | | 2-2 | | | | | | | | | | | 100 | |
| | | 2-3 | | | | | | | | | | | | 100 |
| | thermosetting agent | HP-7200 | 39 | 32 | 58 | | | | | | 6 | | | |
| | | Epicoat 828 | | | | 24 | | | | | | | | 28 |
| | | XD-1000-L | | | | | 31 | | | | | | | |
| | | BPA-328 | | | | | | 22 | | | | | | |
| | | EXA-4816 | | | | | | | 32 | 13 | | | | |
| | | jER-152 | | | | | | | | 33 | 25 | | 10 | |
| | curing promoter | UCAT-5002 | 1.4 | 1.3 | 1.6 | 1.2 | 1.3 | 1.3 | 1.2 | 1.3 | 1.4 | 1.1 | 1.1 | 1.3 |
| coat properties | thermosetting property (% by mass) | | 99 | 98 | 99 | 99 | 97 | 98 | 98 | 99 | 98 | 75 | 86 | 95 |
| | peel strength (N/cm) | | 10.7 | 10.4 | 10.5 | 9.8 | 7.4 | 10.8 | 9.6 | 10.7 | 10.6 | 8.7 | 10.1 | 2.3 |
| | PCT resistance | | ○ | ○ | ○ | ○ | ○ | ○ | ○ | ○ | ○ | x | Δ | ○ |
| | solvent resistance | | ○ | ○ | ○ | ○ | ○ | ○ | ○ | ○ | ○ | x | x | x |

Meanings of the abbreviations in Table 3 are shown as follows.
HP-7200: Epoxy resin of a dicyclopentadiene type manufactured by DIC
Epicoat 828: Epoxy resin of a bisphenol A type manufactured by Japan Epoxy Resin
BPA-328: Epoxy resin of a bisphenol A type manufactured by Nippon Shokubai
XD-1000-L: Epoxy resin of a dicyclopentadiene type manufactured by Nippon Kayaku
EXA-4816: Aliphatic modified epoxy resin manufactured by DIC
jER-152: Epoxy resin of a phenol novolak type manufactured by Japan Epoxy Resin
UCAT-5002: Curing promoter which is a tetraphenyl borate salt of a DBU type manufactured by San-Apro As will be apparent from Table 3, in Examples 1 to 9, the thermosetting property was 90% by mass or more in all cases and the peel strength was 5 N/cm or more in all cases as well. It was also noted in all cases that the PCT resistance was "no abnormality in appearance" and the solvent resistance was "even in 100 times and more, no peeling was noted and no change was noted in the cured coat". Thus, the carboxyl group-containing polyimide of the present invention showed good evaluation results in all terms of thermosetting property, peel strength, PCT resistance and solvent resistance.

In Comparative Example 1, since the cross-linked point was present only at the terminal of the resin and the acid value was low as well, the cross-linking property by heat was low and the thermosetting property was 75% by mass whereby the outcome was no good. In addition, since urethane bond is contained in the resin skeleton, swelling and peeling were generated in terms of PCT resistance whereby the outcome was no good.

In Comparative Example 2, since the cross-linked point was present only at the terminal of the resin, the thermosetting property was 85% by mass whereby the outcome was no good. In addition, since urethane bond is contained in the resin skeleton, swelling and peeling were generated in terms of PCT resistance whereby the outcome was no good.

In Comparative Example 3, the thermosetting property was as good as 95% by mass. However, since a silanol compound was copolymerized, the result was that the adhesive property to the base material was low. In addition, due to water generated by the ring closure reaction of polyamic acid upon polymerization, molecular weight of the resin hardly increased and, moreover, unreacted substance in low molecular weight also remained abundantly whereby durability upon making into a cured coat was weak and solvent resistance was no good.

Synthetic Example 1'-1

To a four-necked flask equipped with stirrer and thermometer were added 389.8 parts by weight of ethylene glycol bis(trimellitic acid anhydride) (TMEG) as a tetracarboxylic acid dianhydride and 1230.6 parts by weight of γ-butyrolactone as a solvent followed by stirring and dissolving at 120° C. To the above was added 137.6 parts by weight of 4,4'-diphenylmethane diisocyanate (MDI) as a diisocyanate compound followed by stirring. Then 0.1 part by weight of 1,8-diazabicyclo[5.4.0]-7-undecene (DBU) was added hereto as a catalyst and the reaction was carried out in a nitrogen stream at 120° C. for 3 hours. After that, the above was cooled down to room temperature to give a terminal acid anhydride group-containing imide prepolymer having the solid concentration of 30% by weight. Composition and number-average molecular weight of this prepolymer are shown in Table 4.

After that, the resulting terminal acid anhydride group-containing imide prepolymer having the solid concentration of 30% by weight was heated up to 100° C. and stirred and 225.0 parts by weight of a polycarbonate diol compound (Duranol T5650E manufactured by Asahi Kasei Chemicals; Mn=500) as a polyol compound and 50.5 parts by weight of γ-butyrolactone were added thereto followed by stirring. Then 2.4 parts by weight of 4-dimethylaminopyridine (DMAP) was added thereto as a catalyst and the reaction was conducted at 100° C. for 8 hours. After that, the above was cooled down to room temperature to give a carboxyl group-containing polyimide (1'-1) having the solid concentration of 37% by weight. Composition and properties of this resin are shown in Table 4. Further, $^1$H-NMR spectrum of the carboxyl group-containing thermosetting polyimide (1'-1) obtained in Synthetic Example 1'-1 is shown in FIG. 1.

Synthetic Examples 1'-2, 1'-7

The same operation as in Synthetic Example 1'-1 was conducted except that the compositions of the materials were changed as shown in Table 4, tetracarboxylic acid dianhydride was dissolved in a solvent at 180° C. and the reaction condition with a diisocyanate compound was made at 180° C. for 3 hours whereupon various carboxyl group-containing polyimides were produced. Composition and properties of these resins are shown in Table 4. Further, $^1$H-NMR spectrum of the carboxyl group-containing thermosetting polyimide (1'-2) obtained in Synthetic Example 1'-2 is shown in FIG. 2.

Synthetic Examples 1'-3, 1'-4, 1'-5, 1'-6

The same operation as in Synthetic Example 1'-1 was conducted except that the compositions of the materials were changed as shown in Table 4 whereupon various carboxyl group-containing polyimides were produced. Composition and properties of these resins are shown in Table 4.

TABLE 4

| | | | | Synthetic Example | | | | | | |
|---|---|---|---|---|---|---|---|---|---|---|
| carboxyl group-containing polyimide | | | | 1'-1 | 1'-2 | 1'-3 | 1'-4 | 1'-5 | 1'-6 | 1'-7 |
| composition (molar ratio) | terminal acid anhydride group-containing imide prepolymer | tetracarboxylic acid dianhydride (A) | TMEG | 95 | | | | | 117 | |
| | | | BPDA | | 91 | | | | | 65 |
| | | | PMDA | | | 78 | | | | |
| | | | BTDA | | | | 84 | | | 41 |
| | | | ODPA | | | | | 87 | | |
| | | diisocyanate compound (B) | MDI | 55 | | | | | 35 | |
| | | | TDI | | 50 | 30 | 57 | 50 | 20 | 45 |
| | | number-average molecular weight (Mn) | | 1300 | 950 | 600 | 1600 | 1350 | 900 | 750 |
| | polyol compound (C) | | C-2090 | | | 27 | | | | |
| | | | T5650E | 45 | | 43 | 20 | 25 | 45 | 12 |
| | | | T5651 | | 50 | | | | | 43 |
| | | | OD-X-688 | | | | 23 | | | |
| | | | Vylon 220 | | | | | 25 | | |
| A/(B + C) | | | molar ratio | 95/100 | 91/100 | 78/100 | 84/100 | 87/100 | 117/100 | 106/100 |

TABLE 4-continued

| carboxyl group-containing polyimide | | Synthetic Example | | | | | | |
|---|---|---|---|---|---|---|---|---|
| | | 1'-1 | 1'-2 | 1'-3 | 1'-4 | 1'-5 | 1'-6 | 1'-7 |
| properties | number-average molecular weight (Mn) | 22000 | 18000 | 11000 | 13500 | 15300 | 13000 | 19000 |
| | resin acid value (equivalents/10$^6$ g) | 1110 | 1010 | 1060 | 640 | 810 | 1550 | 1410 |

Meanings of the abbreviations in Table 4 are shown as follows.
TMEG: Ethylene glycol bis(trimellitic acid anhydride)
BPDA: 3,3',4,4'-Diphenyltetracarboxylic acid dianhydride
PMDA: Pyromellitic acid dianhydride
BTDA: 3,3',4,4'-Benzophenonetetracarboxylic acid dianhydride
ODPA: 4,4'-Oxydiphthalic acid dianhydride
MDI: 4,4'-Diphenylmethane diisocyanate
TDI: 2,4-Toluene diisocyanate
C-2090: Polycarbonate diol manufactured by Kuraray (3-methyl-1,5-pentanediol/1,6-hexanediol), number-average molecular weight = ca. 2,000
T5650E: Polycarbonate diol manufactured by Asahi Kasei Chemicals (1,5-pentanediol/1,6-hexanediol), number-average molecular weight = ca. 500
T5651: Polycarbonate diol manufactured by Asahi Kasei Chemicals (1,5-pentanediol/1,6-hexanediol), number-average molecular weight = ca. 1,000
OD-X-688: aliphatic polyester diol manufactured by DIC (adipic acid/neopentyl glycol/1,6-hexanediol), number-average molecular weight = ca. 2,000
Vylon 220: polyester diol manufactured by Toyobo, number-average molecular weight = ca. 2,000

Comparative Synthetic Example 2'-1

To a four-necked flask equipped with stirrer and thermometer were added 1.86 parts by weight of ethylene glycol as a polyol compound, 49.8 parts by weight of silicon diamine (KF-8010 manufactured by Shinetsu Silicone; Mn=830) as a diamine compound and 41.0 parts by weight of ethylene glycol bis(trimellitic acid anhydride) (TMEG) as a tetracarboxylic acid dianhydride and the mixture was heated up to 180° C. and made to react in a nitrogen stream for 1.5 hours. Then 139.0 parts by weight of γ-butyrolactone was added thereto as a solvent to dissolve. After that, the above was cooled down to room temperature to give a resin (2'-1) having solid concentration of 40% by weight. Composition and properties of the resulting resin are shown in Table 5.

Comparative Synthetic Example 2'-2

In a four-necked flask equipped with stirrer and thermometer, 553 parts by weight of polycarbonate diol (Kuraray Polyol C-2050 manufactured by Kuraray; Mw=2000) as a polycarbonate polyol compound and 62.2 parts by weight of 2,2-dimethylolbutanoic acid (DMBA) as a carboxyl group-containing dihydroxy compound were dissolved in 787 parts by weight of γ-butyrolactone as a solvent and stirred at 90° C. to dissolve. Temperature of the reaction solution was lowered down to 70° C. and 172 parts by weight of 4,4'-diphenylmethane diisocyanate (MDI) as a diisocyanate compound was added thereto followed by stirring. To this was added 0.2 part by weight of dibutyl tin phosphate as a catalyst and the reaction was conducted at 100° C. for 4 hours whereupon it was confirmed that isocyanate almost disappeared. After that, 175 parts by weight of γ-butyrolactone was added thereto to dilute followed by cooling down to room temperature whereupon a carboxyl group-containing resin (2'-2) having solid concentration of 45% by weight was obtained. Composition and properties of the resulting resin are shown in Table 5.

Comparative Synthetic Example 2'-3

In a four-necked flask equipped with stirrer and thermometer, 1000 parts by weight of polycarbonate diol compound (PLACCEL CD-220 manufactured by Daicel Chemical; Mn=2000) as a polyol compound was dissolved in 833.5 parts by weight of γ-butyrolactone as a solvent and stirred at 65° C. to dissolve. 4,4'-Diphenylmethane diisocyanate (MDI) (250.3 parts by weight) was added thereto as a diisocyanate compound followed by stirring and the reaction was conducted at 140° C. for 5 hours. Then 288.2 parts by weight of trimellitic acid anhydride as a carboxylic acid anhydride, 125.1 parts by weight of 4,4'-diphenylmethane diisocyanate (MDI) as a diisocyanate compound and 1361 parts by weight of γ-butyrolactone as a solvent were added thereto followed by stirring and the reaction was conducted at 160° C. for 6 hours. After that, the above was cooled down to room temperature to give a resin (2'-3) having solid concentration of 54% by weight. Composition and properties of the resulting resin are shown in Table 5.

Comparative Synthetic Example 2'-4

In a four-necked flask equipped with stirrer and thermometer, 270 parts by weight of a polycarbonate diol compound (C-2090 manufactured by Kuraray; Mn=2000) as a polyol compound and 51 parts of isophorone diisocyanate (IPDI) were charged into 220 parts by weight of toluene as a solvent and heated up to 60° C. with stirring in a nitrogen stream to uniformly dissolve. To this was added 0.16 part by weight of dibutyl tin laurate as a catalyst and the reaction was conducted at 100° C. for 3 hours to carry out urethanization. Then 380 parts of cyclohexanone and 29 parts of pyromellitic acid dianhydride (PMDA) were added thereto and stirred at 90° C. for 1 hour, 3.5 parts of dimethylbenzylamine was added thereto and the mixture was heated up to 135° C. and made to react for 4 hours. After that, the temperature was lowered to 120° C., 3.5 parts of EX-731 (manufactured by Nagase Chemtex) was added and stirring was conducted for 6 hours while keeping the temperature at 120° C. After cooling down to room temperature, adjustment was done with cyclohexanone so as to make the solid content 35% to give a resin (2'-4). Composition and properties of the resulting resin are shown in Table 5.

TABLE 5

| | resin | | Comparative Synthetic Example | | | |
|---|---|---|---|---|---|---|
| | | | 2'-1 | 2'-2 | 2'-3 | 2'-4 |
| composition (parts by weight) | polyol compound | ethylene glycol | 1.86 | | | |
| | | C-2050 | | 553 | | |
| | | DMBA | | 62.2 | | |
| | | PLACCEL CD-220 | | | 1000 | |
| | | C-2090 | | | | 270 |
| | diamine compound | KF-8010 | 49.8 | | | |
| | diisocyanate compound | MDI | | 172 | 375.4 | |
| | | IPDI | | | | 51 |
| | carboxylic acid anhydride | TMEG | 41 | | | |
| | | TMA | | | 288.2 | |
| | | PMDA | | | | 29 |
| | epoxy compound | EX-731 | | | | 3.5 |
| properties | number-average molecular weight (Mn) | | 3200 | 8800 | 18000 | 30000 |
| | resin acid value (equivalents/$10^6$ g) | | 1100 | 560 | 400 | 620 |

Meanings of the abbreviations in Table 5 are shown as follows.
C-2050: Polycarbonate diol having terminal OH group manufactured by Kuraray, number-average molecular weight = ca. 2,000
DMBA: 2,2-Dimethylolbutanoic acid
PLACCEL CD-220: polycarbonate diol manufactured by Daicel Chemical, number-average molecular weight = ca. 2,000
C-2090: Polycarbonate diol having terminal OH group manufactured by Kuraray, number-average molecular weight = ca. 2,000
KF-8010: Silicon diamine manufactured by Shinetsu Silicone, number-average molecular weight = ca. 830
MDI: 4,4'-Diphenylmethane diisocyanate
IPDI: Isophorone diisocyanate
TMEG: Ethylene glycol bis(trimellitic acid anhydride)
TMA: Trimellitic acid anhydride
PMDA: Pyromellitic acid dianhydride
EX-731: Glycidyl compound manufactured by Nagase Chemtex

Example 1'

To 100 parts by weight of the carboxyl group-containing polyimide (1'-1) obtained in Synthetic Example 1'-1 was added 39 parts by weight of Epiclon HP-7200 (trade name of an epoxy resin of a dicyclopentadiene type manufactured by DIC) as an oxirane ring-containing compound followed by diluting with γ-butyrolactone. Further, 35 parts by weight of flame retardant Exolit OP-935 (a trade name of aluminum trisdiethylphosphinate manufactured by Clariant Japan) as a phosphorus atom-containing organic filler, 1.4 parts by weight of UCAT-5002 (manufactured by San-Apro) as a curing promoter, 3.1 parts by weight of BYK-054 (manufactured by BYK Chemie) as a defoaming agent, 3.2 parts by weight of BYK-358 (manufactured by BYK Chemie) as a leveling agent and 4.7 parts by weight of Aerosil 300 (fine particles of hydrophilic silica manufactured by Nippon Aerosil) as an inorganic or organic filler containing no phosphorus atom) were added thereto, subjected to a rough kneading firstly and then subjected to repeated kneadings for three times using high-speed three roll mill to give a resist ink comprising a thermosetting resin composition where the filler was uniformly dispersed and thixotropy was exhibited. When its viscosity was adjusted using γ-butyrolactone, the solution viscosity was 250 poises and the thixotropic index was 2.7. The resulting resist ink was applied onto a circuit where comb-shaped pattern having interlinear gap of 50 μm was formed on a glossy surface of electrodeposited copper foil of 18 μm thickness, a polyimide film (Apical NPI manufactured by Kaneka) of 25 μm thickness or a two-layered CCL (trade name: Vyloflex manufactured by Toyobo) so as to make the thickness after drying 15 μm. After drying with hot wind at 80° C. for 10 minutes, heating was conducted at 120° C. for 60 minutes in an air atmosphere to give a layered film. Composition and coat properties of the resulting resist ink are shown in Table 6.

Examples 2' to 9', Comparative Examples 1' to 4'

The same operation as in Example 1' was conducted except that the composition was changed to that mentioned in Table 6 whereupon the resist inks of Examples 2' to 9' and Comparative Examples 1' to 4' were prepared. Composition and coat properties of the resulting resist ink are shown in Table 6.

TABLE 6

| | | | Example | | | | | | | | | | Comparative Example | | | |
|---|---|---|---|---|---|---|---|---|---|---|---|---|---|---|---|---|
| | | | 1' | 2' | 3' | 4' | 5' | 6' | 7' | 8' | 9' | 1' | 2' | 3' | 4' |
| composition (parts by weight) | resin (in Examples 1' to 9', carboxyl group-containing thermosetting polyimide) | 1'-1 | 100 | | | | | | | | | | | | |
| | | 1'-2 | | 100 | | | | | | | | | | | |
| | | 1'-3 | | | 100 | | | | | | | | | | |
| | | 1'-4 | | | | 100 | | | | | | | | | |
| | | 1'-5 | | | | | 100 | | | | | | | | |
| | | 1'-6 | | | | | | 100 | | | | 100 | | | |
| | | 1'-7 | | | | | | | 100 | | | | | | |
| | | 2'-1 | | | | | | | | 100 | | | 100 | | |
| | | 2'-2 | | | | | | | | | 100 | | | | |
| | | 2'-3 | | | | | | | | | | | | 100 | |
| | | 2'-4 | | | | | | | | | | | | | 100 |
| | thermosetting agent (oxirane ring-containing compound) | HP-7200 | 39 | 32 | 58 | 24 | | | | | | | | | |
| | | Epicoat 828 | | | | | | | | | | 28 | | | |
| | | XD-1000-L | | | | | | | | | | | | | |
| | | BPA-328 | | | | | 31 | 22 | | | | | 16 | | 18 |
| | | EXA-4816 | | | | | | | 32 | 33 | 13 | | | | |
| | | jER-152 | | | | | | | | | 25 | | | | |
| | flame retardant (phosphorus atom-containing organic filler) | OP-935 | 35 | 30 | 41 | 29 | 33 | 30 | 34 | 25 | 30 | 34 | 33 | | 38 |
| | | OP-930 | | | | | | | | 25 | 15 | | | | |
| | | HCA-HQ | | | | | | | | | | | | 10 | |
| | | PHOSMEL-200 | | | | | | | | | | | | 28 | |
| | curing promoter | UCAT-5002 | 1.4 | 1.3 | 1.6 | 1.2 | 1.3 | 1.3 | 1.2 | 1.3 | 1.4 | 1.1 | 1.1 | 1.3 | 1.2 |
| | defoaming agent | BYK-054 | 3.1 | 2.9 | 3.5 | 2.7 | 2.9 | 2.9 | 2.8 | 3.2 | 3.2 | 2.9 | 2.6 | 2.5 | 2.8 |
| | leveling agent | BYK-354 | 3.2 | 3.0 | 3.6 | 2.8 | 3.0 | 3.0 | 2.8 | 3.3 | 3.3 | 2.9 | 2.7 | 2.5 | 2.8 |
| | filler other than phosphorous atom-containing organic filler | Aerosil 300 | 4.7 | 4.3 | 5.3 | 4.1 | 4.4 | 4.3 | 4.2 | 4.8 | 4.9 | 4.3 | 4.0 | 3.7 | 4.1 |
| | phosphorus content (%) | | 3.8 | 3.5 | 3.9 | 3.6 | 3.8 | 3.5 | 4.2 | 3.8 | 3.8 | 4.0 | 4.2 | 3.9 | 4.7 |
| coat properties | flame retarding property | | VTM-0 | VTM-0 | VTM-0 | VTM-0 | VTM-0 | VTM-0 | VTM-0 | VTM-0 | VTM-0 | VTM-0 | VTM-0 | VTM-0 | VTM-0 |
| | solder dip resistance | | ○ | ○ | ○ | ○ | ○ | ○ | ○ | ○ | ○ | ○ | △ | D | ○ |
| | heat aging resistance | | ○ | ○ | ○ | ○ | ○ | ○ | ○ | ○ | ○ | △ | △ | | ? |
| | flexibility | | ○ | ○ | ○ | ○ | ○ | ○ | ○ | ○ | ○ | x | x | x | ○ |

Meanings of the abbreviations in Table 6 are shown as follows.
HP-7200: Epoxy resin of a dicyclopentadiene type manufactured by DIC
Epicoat 828: Epoxy resin of a bisphenol A type manufactured by Japan Epoxy Resin
XD-1000-L: Epoxy resin of a dicyclopentadiene type manufactured by Nippon Kayaku
BPA-328: Epoxy resin of a bisphenol A type manufactured by Nippon Shokubai
EXA-4816: Aliphatic modified epoxy resin manufactured by DIC
jER-152: Epoxy resin of a phenol novolak type manufactured by Japan Epoxy Resin
OP-935: Aluminum trisdiethylphosphinate manufactured by Clariant Japan
OP-930: Aluminum trisdiethylphosphinate manufactured by Clariant Japan
HCA-HQ: 10-(2,5-Dihydroxyphenyl)-10H-9-oxa-10-phosphaphenanthrene = 10-oxide manufactured by Sanko
PHOSMEL-200: Polyphosphate of melamine, melene and melene manufactured by Nissan Chemical Industries
UCAT-5002: Tetraphenyl borate salt of a DBU type (curing promoter) manufactured by San-Apro
BYK-054: Defoaming agent manufactured by BYK Chemie
BYK-358: Leveling agent manufactured by BYK Chemie
Aerosil 300: Fine particles of hydrophilic silica manufactured by Nippon Aerosil As will be apparent from Table 6, good evaluation results were achieved for all evaluating items as a solder resist in Examples 1' to 9'.

Comparative Example 1' was inferior in heat aging resistance and flexibility. In the resin used here, molecular weight of the resin hardly increases due to water which was generated in the ring closure reaction of polyamic acid during the polymerization of the resin whereby no hard cured coat was prepared and heat aging resistance was bad. In addition, flexibility was also poor because of copolymerization of a silicone compound with the resin and also because of addition of a lot of flame retardant for imparting the flame retarding property.

Comparative Example 2' was inferior in solder dip resistance, heat aging resistance and flexibility. In the resin used here, carboxyl group was introduced into the resin by means of copolymerization of abundant 2,2-dimethylolbutanoic acid. However, 2,2-dimethylolbutanoic acid has a poor polymerizing ability whereby it is localized in the main chain of the resin and the molecular weight is low as well. In addition, it also remains as an unreacted substance whereby curing property was bad, peeling of the coat was significant according to a solder dip resistance test and the coat was broken within short time in a flexibility test. Moreover, changes in the color of the coat were significant in a heat aging resistance.

Comparative Example 3' was inferior in heat aging resistance and flexibility. Since the resin used here contains an amide-imide bond in its skeleton, it has a stiff skeleton as compared with Examples and has a high elastic modulus. A lot of flame retarding filler is added for imparting the flame retarding property whereby the coat becomes fragile and, in a flexibility test, the coat is broken. Further, the cross-linking point in the resin skeleton is present only in the resin terminal whereby no strong cured coat was achieved and the heat aging resistance was insufficient.

Comparative Example 4' was inferior in heat aging resistance. Since the resin used here contains a urethane bond in its skeleton, the urethane bond is degraded upon being exposed to high temperature for long time whereby changes in the color of the coat were significant in a heat aging resistance.

Synthetic Example 1"-1

To a four-necked flask equipped with stirrer and thermometer were added 389.8 parts by weight of ethylene glycol bis(trimellitic acid anhydride) (TMEG) as a tetracarboxylic acid dianhydride and 1230.6 parts by weight of γ-butyrolactone as a solvent followed by stirring and dissolving at 120° C. To the above was added 137.6 parts by weight of 4,4'-diphenylmethane diisocyanate (MDI) as a diisocyanate compound followed by stirring. Then 0.1 part by weight of 1,8-diazabicyclo[5.4.0]-7-undecene (DBU) was added hereto as a catalyst and the reaction was carried out in a nitrogen stream at 120° C. for 3 hours. After that, the above was cooled down to room temperature to give a terminal acid anhydride group-containing imide prepolymer having the solid concentration of 30% by weight. Composition and number-average molecular weight of this prepolymer are shown in Table 7.

After that, the resulting terminal acid anhydride group-containing imide prepolymer having the solid concentration of 30% by weight was heated up to 100° C. and stirred and 225.0 parts by weight of a polycarbonate diol compound (Duranol T5650E manufactured by Asahi Kasei Chemicals; Mn=500) as a polyol compound and 50.5 parts by weight of γ-butyrolactone were added thereto followed by stirring. Then 2.4 parts by weight of 4-dimethylaminopyridine (DMAP) was added thereto as a catalyst and the reaction was conducted at 100° C. for 8 hours. After that, the above was cooled down to room temperature to give a carboxyl group-containing polyimide (1"-1) having the solid concentration of 37% by weight. Composition and properties of this resin are shown in Table 7. Further, $^1$H-NMR spectrum of the carboxyl group-containing thermosetting polyimide (1"-1) obtained in Synthetic Example 1"-1 is shown in FIG. 1.

Synthetic Examples 1"-2, 1"-7

The same operation as in Synthetic Example 1"-1 was conducted except that the compositions of the materials were changed as shown in Table 7, tetracarboxylic acid dianhydride was dissolved in a solvent at 180° C. and the reaction condition with a diisocyanate compound was made at 180° C. for 3 hours whereupon various carboxyl group-containing polyimides were produced. Composition and properties of these resins are shown in Table 7. Further, $^1$H-NMR spectrum of the carboxyl group-containing thermosetting polyimide (1"-2) obtained in Synthetic Example 1"-2 is shown in FIG. 2.

Synthetic Examples 1"-3, 1"-4, 1"-5, 1"-6

The same operation as in Synthetic Example 1"-1 was conducted except that the compositions of the materials were changed as shown in Table 7 whereupon various carboxyl group-containing polyimides were produced. Composition and properties of these resins are shown in Table 7.

TABLE 7

|  |  |  |  | Synthetic Example ||||||| 
|---|---|---|---|---|---|---|---|---|---|---|
| carboxyl group-containing polyimide |||| 1"-1 | 1"-2 | 1"-3 | 1"-4 | 1"-5 | 1"-6 | 1"-7 |
| composition (molar ratio) | terminal acid anhydride group-containing imide prepolymer | tetracarboxylic acid dianhydride (A) | TMEG | 95 |  |  |  |  | 117 |  |
|  |  |  | BPDA |  | 91 |  |  |  |  | 65 |
|  |  |  | PMDA |  |  | 78 |  |  |  |  |
|  |  |  | BTDA |  |  |  | 84 |  |  | 41 |
|  |  |  | ODPA |  |  |  |  | 87 |  |  |
|  | diisocyanate compound (B) |  | MDI | 55 |  |  |  |  | 35 |  |
|  |  |  | TDI |  | 50 | 30 | 57 | 50 | 20 | 45 |
|  | number-average molecular weight (Mn) ||| 1300 | 950 | 600 | 1600 | 1350 | 900 | 750 |
|  | polyol compound (C) |  | C-2090 |  |  | 27 |  |  |  |  |
|  |  |  | T5650E | 45 |  | 43 | 20 | 25 | 45 | 12 |
|  |  |  | T5651 |  | 50 |  |  |  |  | 43 |
|  |  |  | OD-X-688 |  |  |  | 23 |  |  |  |
|  |  |  | Vylon 220 |  |  |  |  | 25 |  |  |
| A/(B + C) ||| molar ratio | 95/100 | 91/100 | 78/100 | 84/100 | 87/100 | 117/100 | 106/100 |

TABLE 7-continued

| carboxyl group-containing polyimide | | Synthetic Example | | | | | | |
|---|---|---|---|---|---|---|---|---|
| | | 1″-1 | 1″-2 | 1″-3 | 1″-4 | 1″-5 | 1″-6 | 1″-7 |
| properties | number-average molecular weight (Mn) | 22000 | 18000 | 11000 | 13500 | 15300 | 13000 | 19000 |
| | resin acid value (equivalents/$10^6$ g) | 1110 | 1010 | 1060 | 640 | 810 | 1550 | 1410 |

Meanings of the abbreviations in Table 7 are shown as follows.
TMEG: Ethylene glycol bis(trimellitic acid anhydride)
BPDA: 3,3′,4,4′-Diphenyltetracarboxylic acid dianhydride
PMDA: Pyromellitic acid dianhydride
BTDA: 3,3′,4,4′-Benzophenonetetracarboxylic acid dianhydride
ODPA: 4,4′-Oxydiphthalic acid dianhydride
MDI: 4,4′-Diphenylmethane diisocyanate
TDI: 2,4-Toluene diisocyanate
C-2090: Polycarbonate diol manufactured by Kuraray (3-methyl-1,5-pentanediol/1,6-hexanediol), number-average molecular weight = ca. 2,000
T5650E: Polycarbonate diol manufactured by Asahi Kasei Chemicals (1,5-pentanediol/1,6-hexanediol), number-average molecular weight = ca. 500
T5651: Polycarbonate diol manufactured by Asahi Kasei Chemicals (1,5-pentanediol/1,6-hexanediol), number-average molecular weight = ca. 1,000
OD-X-688: Aliphatic polyester diol manufactured by DIC (adipic acid/neopentyl glycol/1,6-hexanediol), number-average molecular weight = ca. 2,000
Vylon 220: Polyester diol manufactured by Toyobo, number-average molecular weight = ca. 2,000

Comparative Synthetic Example 2″-1

In a four-necked flask equipped with stirrer and thermometer, 50 parts by weight of polybutadiene having terminal OH group (G-3000 manufactured by Nippon Soda; Mn=3000) as a polyol compound was dissolved in 23.5 parts by weight of γ-butyrolactone as a solvent and stirred and dissolved at 50° C. 2,4-Toluene diisocyanate (TDI) (4.8 parts by weight) was added thereto as a diisocyanate compound and stirred therewith. To this was added 0.007 part by weight of dibutyl tin dilaurate as a catalyst and the reaction was conducted for 5 hours. Then the above was cooled down to room temperature. After that, 8.83 g of 3,3′,4,4′-benzophenonetetracarboxylic acid dianhydride (BTDA) as a tetracarboxylic acid dianhydride, 0.07 g of triethylenediamine as a catalyst and 4.09 parts by weight of γ-butyrolactone as a solvent were added thereto followed by stirring and the reaction was conducted at 130° C. for 6 hours. Further, 1.43 parts by weight of 2,4-toluene diisocyanate (TDI) was added thereto followed by stirring and the reaction was conducted at 130° C. for 6 hours. After that, it was cooled down to room temperature to give a resin (2″-1) having solid concentration of 40% by weight. Composition and properties of the resulting resin are shown in Table 8.

Comparative Synthetic Example 2″-2

In a four-necked flask equipped with stirrer and thermometer, 1000 parts by weight of polycarbonate diol compound (PLACCEL CD-220 manufactured by Daicel Chemical; Mn=2000) as a polyol compound was dissolved in 833.5 parts by weight of γ-butyrolactone as a solvent and stirred at 65° C. to dissolve. 4,4′-Diphenylmethane diisocyanate (MDI) (250.3 parts by weight) was added thereto as a diisocyanate compound followed by stirring and the reaction was conducted at 140° C. for 5 hours. Then 288.2 parts by weight of trimellitic acid anhydride as a carboxylic acid anhydride, 125.1 parts by weight of 4,4′-diphenylmethane diisocyanate (MDI) as a diisocyanate compound and 1361 parts by weight of γ-butyrolactone as a solvent were added thereto followed by stirring and the reaction was conducted at 160° C. for 6 hours. After that, the above was cooled down to room temperature to give a resin (2″-2) having solid concentration of 54% by weight. Composition and properties of the resulting resin are shown in Table 8.

Comparative Synthetic Example 2″-3

To a four-necked flask equipped with stirrer and thermometer were added 1.86 parts by weight of ethylene glycol as a polyol compound, 49.8 parts by weight of silicon diamine (KF-8010 manufactured by Shinetsu Silicone; Mn=830) as a diamine compound and 41.0 parts by weight of ethylene glycol bis(trimellitic acid anhydride) (TMEG) as a tetracarboxylic acid dianhydride and the mixture was heated up to 180° C. and made to react in a nitrogen stream for 1.5 hours. Then 139.0 parts by weight of γ-butyrolactone was added thereto as a solvent to dissolve. After that, the above was cooled down to room temperature to give a resin (2″-3) having solid concentration of 40% by weight. Composition and properties of the resulting resin are shown in Table 8.

TABLE 8

| resin | | | Comparative Synthetic Example | | |
|---|---|---|---|---|---|
| | | | 2″-1 | 2″-2 | 2″-3 |
| composition (parts by weight) | polyol compound | G-3000 | 50 | | |
| | | PLACCEL CD-220 | | 1000 | |
| | | ethylene glycol | | | 1.86 |
| | diamine compound | KF-8010 | | | 49.8 |
| | diisocyanate compound | TDI | 6.23 | | |
| | | MDI | | 375.4 | |
| | carboxylic acid anhydride | BTDA | 8.83 | | |
| | | TMEG | | | 41 |
| | | TMA | | 288.2 | |
| properties | number-average molecular weight (Mn) | | 12000 | 18000 | 3200 |
| | resin acid value (equivalents/$10^6$ g) | | 175 | 400 | 1100 |

Meanings of the abbreviations in Table 8 are shown as follows.
G-3000: polybutadiene having terminal OH group manufactured by Nippon Soda, number-average molecular weight = ca. 3,000
PLACCEL CD-220: polycarbonate diol manufactured by Daicel Chemical, number-average molecular weight = ca. 2,000
KF-8010: silicon diamine manufactured by Shinetsu Silicone, number-average molecular weight = ca. 830
TDI: 2,4-Toluene diisocyanate
MDI: 4,4′-Diphenylmethane diisocyanate
BTDA: 3,3′,4,4′-Benzophenonetetracarboxylic acid dianhydride
TMEG: Ethylene glycol bis(trimellitic acid anhydride)
TMA: Trimellitic acid anhydride Example 1″

To 100 parts by weight of the resin of the carboxyl group-containing polyimide (1″-1) prepared in Synthetic Example 1″-1 was added 39 parts by weight of HP-7200 (trade name of an epoxy resin of a dicyclopentadiene type manufactured by DIC) followed by diluting with γ-butyrolactone. Further, 1.4 parts by weight of UCAT-5002 (manufactured by San-Apro) as a curing promoter was added thereto followed by well stirring using a paint shaker to give a compounded product comprising the carboxyl group-containing polyimide of the present invention. The resulting compounded product was applied onto a glossy side of electrodeposited copper foil of 18 μm thickness so as to make the thickness after drying 20 μm. After drying with hot air of 80° C. for 10 minutes, heating was conducted at 120° C. for 60 minutes in an air atmosphere to give a flexible metal-clad laminate. Composition of the compounded product and evaluation result of the resulting laminate are shown in Table 9.

Examples 2" to 9", Comparative Examples 1" to 3'

The same operation as in Example 1" was conducted except that the composition was changed as mentioned in Table 9 whereupon the laminates of Examples 2" to 9" and Comparative Examples 1" to 3" were prepared. Composition of the compounded product and evaluation result of the resulting laminate are shown in Table 9.

tion results in all terms of thermosetting property, peel strength, PCT resistance and solvent resistance.

In Comparative Example 1", since the cross-linked point was present only at the terminal of the resin and the acid value was low as well, the cross-linking property by heat was low and the thermosetting property was 75% by mass whereby the outcome was no good. In addition, since urethane bond is contained in the resin skeleton, swelling and peeling were generated in terms of PCT resistance whereby the outcome was no good.

In Comparative Example 2", since the cross-linked point was present only at the terminal of the resin, the thermosetting property was 85% by mass whereby the outcome was no good. In addition, since urethane bond is contained in the resin skeleton, swelling and peeling were generated in terms of PCT resistance whereby the outcome was no good.

In Comparative Example 3", the thermosetting property was as good as 95% by mass. However, since a silanol compound was copolymerized, the result was that the adhesive property to the base material was low. In addition, due to water generated by the ring closure reaction of polyamic acid

TABLE 9

| compounded product | | | Example | | | | | | | | | Comparative Example | | |
|---|---|---|---|---|---|---|---|---|---|---|---|---|---|---|
| | | | 1" | 2" | 3" | 4" | 5" | 6" | 7" | 8" | 9" | 1" | 2" | 3" |
| composition (parts by weight) | resin | 1"-1 | 100 | 100 | 100 | | | | | | | | | |
| | | 1"-2 | | | | 100 | | | | | | | | |
| | | 1"-3 | | | | | 100 | | | | | | | |
| | | 1"-4 | | | | | | 100 | | | | | | |
| | | 1"-5 | | | | | | | 100 | | | | | |
| | | 1"-6 | | | | | | | | 100 | | | | |
| | | 1"-7 | | | | | | | | | 100 | | | |
| | | 2"-1 | | | | | | | | | | 100 | | |
| | | 2"-2 | | | | | | | | | | | 100 | |
| | | 2"-3 | | | | | | | | | | | | 100 |
| | thermosetting agent | HP-7200 | 39 | 32 | 58 | | | | | | | 6 | | |
| | | Epicoat 828 | | | | 24 | | | | | | | | 28 |
| | | XD-1000-L | | | | | 31 | | | | | | | |
| | | BPA-328 | | | | | | 22 | | | | | | |
| | | EXA-4816 | | | | | | | 32 | | 13 | | | |
| | | jER-152 | | | | | | | | 33 | 25 | | 10 | |
| | curing promoter | UCAT-5002 | 1.4 | 1.3 | 1.6 | 1.2 | 1.3 | 1.3 | 1.2 | 1.3 | 1.4 | 1.1 | 1.1 | 1.3 |
| coat properties | thermosetting property (% by mass) | | 99 | 98 | 99 | 99 | 97 | 98 | 98 | 99 | 98 | 75 | 86 | 95 |
| | peel strength (N/cm) | | 10.7 | 10.4 | 10.5 | 9.8 | 7.4 | 10.8 | 9.6 | 10.7 | 10.6 | 8.7 | 10.1 | 2.3 |
| | PCT resistance | | ○ | ○ | ○ | ○ | ○ | ○ | ○ | ○ | ○ | x | Δ | ○ |
| | solvent resistance | | ○ | ○ | ○ | ○ | ○ | ○ | ○ | ○ | ○ | x | x | x |

Meanings of the abbreviations in Table 9 are shown as follows.
HP-7200: Epoxy resin of a dicyclopentadiene type manufactured by DIC
Epicoat 828: Epoxy resin of a bisphenol A type manufactured by Japan Epoxy Resin
XD-1000-L: Epoxy resin of a dicyclopentadiene type manufactured by Nippon Kayaku
BPA-328: Epoxy resin of a bisphenol A type manufactured by Nippon Shokubai
EXA-4816: Aliphatic modified epoxy resin manufactured by DIC
jER-152: Epoxy resin of a phenol novolak type manufactured by Japan Epoxy Resin
UCAT-5002: Curing promoter which is a tetraphenyl borate salt of a DBU type manufactured by San-Apro As will be apparent from Table 9, good evaluation results were achieved for all evaluating items of thermosetting property, peel strength, PCT resistance and solvent resistance in Examples 1" to 9". To be specific, in Examples 1" to 9", the thermosetting property was 90% by mass or more in all cases and the peel strength was 5 N/cm or more in all cases as well. It was also noted in all cases that the PCT resistance was "no abnormality in appearance" and the solvent resistance was "even in 100 times and more, no peeling was noted and no change was noted in the cured coat". Thus, the flexible metal-clad laminate of the present invention showed good evaluaupon polymerization, molecular weight of the resin hardly increased and, moreover, unreacted substance in low molecular weight also remained abundantly whereby durability upon making into a laminate was weak and solvent resistance was no good.

According to the present invention, it is possible to provide a carboxyl group-containing polyimide which gives a cured product highly satisfying thermosetting property, PCT resistance, solvent resistance and peel strength at the same time. Further, when the carboxyl group-containing polyimide of the present invention is used together with a thermosetting agent, it is possible to form a cross-linking structure in high degree and to prepare a strong cured coat. Furthermore, since the carboxyl group-containing polyimide of the present invention gives a cured product which highly satisfies the above characteristics, it can be advantageously used for a resist ink and an adhesive as well as for a printed circuit board, etc. of automobile parts, electric appliances, etc. using the same. Therefore, it is expected that the present invention contributes to development of industry to a great extent.

In addition, the thermosetting resin composition of the present invention can be used for manufacturing a thermosetting layer having excellent curing property and good flame retarding property, solder dip resistance, heat aging resistance, flexibility, etc. and it can be advantageously used particularly as a resist layer of a printed circuit board which demands durability for long time use at high temperature.

Moreover, since the flexible metal-clad laminate of the present invention highly satisfies the above characteristics, it can be advantageously used for a flexible printed circuit board, etc. being used in electronic parts, automobile parts, electric appliances, etc.

The invention claimed is:

1. A thermosetting resin composition to be used as a resist layer of a printed circuit board, comprising a carboxyl group-containing polyimide and an oxirane ring-containing compound, wherein in the carboxyl group-containing polyimide, the chain of a terminal acid anhydride group-containing imide prepolymer is extended via a polycarbonate polyol having a number-average molecular weight of 100 to 30,000, wherein the terminal acid anhydride group-containing imide prepolymer is produced by reacting an acid anhydride group in a tetracarboxylic acid dianhydride with an isocyanate group in a diisocyanate compound, and wherein the thermosetting resin composition has no urethane bonds in the resin skeleton.

2. The thermosetting resin composition according to claim 1, wherein an amount of the oxirane ring-containing compound is 2 to 100 parts by weight to 100 parts by weight of the carboxyl group-containing polyimide.

3. The thermosetting resin composition according to claim 1, further comprising a phosphorus atom-containing organic filler.

4. The thermosetting resin composition according to claim 3, wherein a ratio by weight of the carboxyl group-containing polyimide, the oxirane ring-containing compound and the phosphorus atom-containing organic filler is 30 to 95:1 to 50:2 to 55.

5. The thermosetting resin composition according to claim 3, wherein a total weight of the carboxyl group-containing polyimide, the oxirane ring-containing compound and the phosphorus atom-containing organic filler in the thermosetting resin composition is not less than 20% by weight.

6. The thermosetting resin composition according to claim 1, further comprising a curing promoter.

* * * * *